United States Patent
Bharaj et al.

(10) Patent No.: US 12,412,376 B2
(45) Date of Patent: Sep. 9, 2025

(54) MACHINE-LEARNING-BASED DETECTION OF FAKE VIDEOS

(71) Applicant: Reality Defender, Inc., New York, NY (US)

(72) Inventors: Gaurav Bharaj, San Francisco, CA (US); Trevine Oorloff, College Park, MD (US); Surya Koppisetti, Coquitlam (CA); Nicolò Bonettini, Montefiorino (IT); Ben Colman, New York, NY (US); Ali Shahriyari, Las Vegas, NV (US)

(73) Assignee: Reality Defender, Inc., New York, NY (US)

( * ) Notice: Subject to any disclaimer, the term of this patent is extended or adjusted under 35 U.S.C. 154(b) by 0 days.

(21) Appl. No.: 18/744,440

(22) Filed: Jun. 14, 2024

(65) Prior Publication Data

US 2025/0166358 A1    May 22, 2025

Related U.S. Application Data

(60) Provisional application No. 63/600,581, filed on Nov. 17, 2023.

(51) Int. Cl.
*G06V 10/774* (2022.01)
*G06V 20/40* (2022.01)
(Continued)

(52) U.S. Cl.
CPC ............ *G06V 10/774* (2022.01); *G06V 20/41* (2022.01); *G06V 20/49* (2022.01); *G06V 40/172* (2022.01);
(Continued)

(58) Field of Classification Search
CPC ...... G06V 10/774; G06V 20/41; G06V 20/49; G06V 40/172; G06V 40/40; G10L 17/04; G10L 17/26; G10L 25/57
See application file for complete search history.

(56) References Cited

U.S. PATENT DOCUMENTS

| | | | |
|---|---|---|---|
| 2020/0160502 A1* | 5/2020 | Nießner | G06V 10/431 |
| 2021/0174487 A1* | 6/2021 | Nießner | G06V 10/431 |

(Continued)

OTHER PUBLICATIONS

Gong, Yuan, et al. "Contrastive audio-visual masked autoencoder." arXiv preprint arXiv:2210.07839 (2022).*

(Continued)

*Primary Examiner* — Ross Varndell
(74) *Attorney, Agent, or Firm* — Morrison & Foerster LLP

(57) ABSTRACT

A method for training a model for classifying videos as real or fake can include generating image tiles and audio data segments from an input video, generating a sequence of image embeddings based on the image tiles using a visual encoder and a sequence of audio embeddings based on the audio data segments using an audio encoder, transforming, using a V2A network, a first subset of the sequence of image embeddings into synthetic audio embeddings, transforming, using an A2V network, a first subset of the sequence of audio embeddings into synthetic image embeddings, updating the sequence of image embeddings by using the synthetic image embeddings, updating the sequence of audio embeddings using the synthetic audio embeddings, training the encoders and the networks using the updated sequences of image embeddings and audio embeddings, and training a classifier using the trained encoders and the trained networks.

18 Claims, 16 Drawing Sheets
(1 of 16 Drawing Sheet(s) Filed in Color)

(51) Int. Cl.
| | |
|---|---|
| *G06V 40/16* | (2022.01) |
| *G06V 40/40* | (2022.01) |
| *G10L 17/02* | (2013.01) |
| *G10L 17/04* | (2013.01) |
| *G10L 17/26* | (2013.01) |
| *G10L 25/57* | (2013.01) |

(52) U.S. Cl.
CPC .............. *G06V 40/40* (2022.01); *G10L 17/02* (2013.01); *G10L 17/04* (2013.01); *G10L 17/26* (2013.01); *G10L 25/57* (2013.01)

(56) References Cited

U.S. PATENT DOCUMENTS

| | | | | |
|---|---|---|---|---|
| 2022/0138472 | A1* | 5/2022 | Mittal | G06N 3/045 |
| | | | | 382/181 |
| 2022/0310113 | A1* | 9/2022 | Tzinis | G06V 10/82 |
| 2022/0343543 | A1* | 10/2022 | Sengupta | G10L 17/18 |
| 2023/0401824 | A1* | 12/2023 | Khan | G06V 20/70 |

OTHER PUBLICATIONS

Devlin, Jacob et al. "BERT: Pre-training of Deep Bidirectional Transformers for Language Understanding." North American Chapter of the Association for Computational Linguistics (2019).*
Yang et al., "AVoiD-DF: Audio-Visual Joint Learning for Detecting Deepfake," in IEEE Transactions on Information Forensics and Security, vol. 18, pp. 2015-2029, 2023, doi: 10.1109/TIFS.2023.3262148.*
Lewis, John et al. "Deepfake Video Detection Based on Spatial, Spectral, and Temporal Inconsistencies Using Multimodal Deep Learning." 2020 IEEE Applied Imagery Pattern Recognition Workshop (AIPR) (2020): 1-9.*
Taylor, W. L. (1953). "Cloze procedure": a new tool for measuring readability. Journalism Quarterly, 30, 415-433.*
Afouras et al. (Oct. 2018). "LRS3-TED: a large-scale dataset for visual speech recognition," Visual Geometry Group, Department of Engineering Science, University of Oxford, UK; 2 pages.
Agarwal et al. "Detecting Deep-Fake Videos from Phoneme-Viseme Mismatches," IEEE/CVF Conference on Computer Vision and Pattern Recognition (CVPR), Jun. 13-19, 2020, Seattle, WA; 9 pages.
Arjovsky et al. "Wasserstein Generative Adversarial Networks," 34th International Conference on Machine Learning, Aug. 6-11, 2017, Sydney, Australia; 10 pages.
Baltruaitis et al. (May 2017). "Multimodal Machine Learning: A Survey and Taxonomy," IEEE Transactions on Pattern Analysis and Machine Intelligence, 41(2): pp. 1-20.
Cai et al. "MARLIN: Masked Autoencoder for facial video representation learnINg," IEEE/CVF Conference on Computer Vision and Pattern Recognition, Jun. 17-24, 2023, Vancouver, BC, Canada; pp. 1493-1504.
Cheng et al. (Jun. 2022). "Voice-Face Homogeneity Tells Deepfake," located at https://arxiv.org/abs/2203.02195; pp. 1-13.
Chugh et al. "Not made for each other—Audio-Visual Dissonance-based Deepfake Detection and Localization," 28th ACM international Conference on multimedia, Oct. 12-16, 2020, Seattle, Washington; 9 pages.
Chung et al. (2016). "Out of time: automated lip sync in the wild," Visual Geometry Group, Department of Engineering Science, University of Oxford; 14 pages.
Devlin et al. "BERT: Pre-training of Deep Bidirectional Transformers for Language Understanding," 2019 North American Chapter of the Association for Computational Linguistics, Jun. 2-7, 2019, Minneapolis, Minnesota; pp. 4171-4176.
Dolhansky et al. (Oct. 2020). "The Deepfake Detection Challenge (DFDC) Dataset," located at https://arxiv.org/abs/2006.07397; pp. 1-13.
Dong et al. "Implicit Identity Leakage: The Stumbling Block to Improving Deepfake Detection Generalization," IEEE/CVF Conference on Computer Vision and Pattern Recognition (CVPR), Jun. 18-22, 2023, Vancouver, BC, Canada, pp. 3994-4004.
Dong et al. "Protecting Celebrities from DeepFake with Identity Consistency Transformer," IEEE/CVF Conference on Computer Vision and Pattern Recognition (CVPR), Jun. 18-24, 2022. New Orleans, LA, pp. 9458-9468.
Dosovitskiy et al. "An Image is Worth 16x16 Words: Transformers for Image Recognition at Scale," International Conference on Learning Representations, May 3-7, 2021, Virtual Conference; pp. 1-22.
Feng et al. "Self-Supervised Video Forensics by Audio-Visual Anomaly Detection," IEEE/CVF Conference on Computer Vision and Pattern Recognition, Jun. 17-24, 2023, Vancouver, BC, Canada; pp. 10491-10503.
Gemmeke et al. "Audio Set: An Ontology and Human-Labeled Dataset for Audio Events," IEEE International Conference on Acoustics, Speech and Signal Processing (ICASSP), Mar. 5-9, 2017; pp. 776-780.
Georgescu et al. "Audiovisual Masked Autoencoders," IEEE/CVF International Conference on Computer Vision, Oct. 1-6, 2023, Paris, France; pp. 16144-16154.
Guzhov et al. "AudioCLIP: Extending CLIP to Image, Text and Audio," IEEE International Conference on Acoustics, Speech and Signal Processing (ICASSP), May 22-27, 2022, Singapore; pp. 1-14.
Haliassos et al. "Leveraging real talking faces via self-supervision for robust forgery detection," IEEE/CVF Conference on Computer Vision and Pattern Recognition, Jun. 18-24, 2022. New Orleans, Louisiana, pp. 14950-14962.
Haliassos et al. "Lips Don't Lie: A Generalisable and Robust Approach to Face Forgery Detection," IEEE/CVF Conference on Computer Vision and Pattern Recognition (CVPR), Jun. 20-25, 2021. Nashville, Tennessee; pp. 5039-5049.
He et al. "Masked Autoencoders Are Scalable Vision Learners," IEEE/CVF Conference on Computer Vision and Pattern Recognition (CVPR), Jun. 18-24, 2022, New Orleans, Louisiana; pp. 16000-16009.
Huang et al. "Masked Autoencoders that Listen," 36th International Conference on Neural Information Processing Systems, Nov. 28-Dec. 9, 2022, New Orleans, Louisiana; pp. 1-20.
Huang et al. "Implicit Identity Driven Deepfake Face Swapping Detection," IEEE/CVF Conference on Computer Vision and Pattern Recognition (CVPR), Jun. 17-24, 2023, Vancouver, BC, Canada; pp. 4490-4499.
Huang et al. "MAViL: Masked Audio-Video Learners," 37th Conference on Neural Information Processing Systems (NeurIPS 2023), Dec. 10-16, 2023, New Orleans, Louisiana; pp. 1-23.
Ilyas et al. (Feb. 2023). "AVFakeNet: A unified end-to-end Dense Swin Transformer deep learning model for audio-visual deepfakes detection," Applied Soft Computing 136(110124); pp. 1-16.
International Search Report and Written Opinion mailed Dec. 17, 2024, directed to International Application No. PCT/US2024/056146; 12 pages.
Jia et al. "Transfer Learning from Speaker Verification to Multispeaker Text-To-Speech Synthesis," 32nd Annual Conference on Neural Information Processing Systems (NIPS), Dec. 2-8, 2018, Montréal, Canada; pp. 1-11.
Jung et al. (Apr. 2020). "DeepVision: Deepfakes detection using human eye blinking pattern," IEEE Access; pp. 1-13.
Kaddar et al. "HHCiT: Deepfake Video Detection Using a Hybrid Model of CNN features and Vision Transformer," In 2021 International Conferenceon Visual Communications and Image Processing (VCIP), Dec. 5-8, 2021, Munich, Germany; 5 pages.
Khalid et al. (Sep. 2021). "FakeAVCeleb: A Novel Audio-Video Multimodal Deepfake Dataset," located at https://arxiv.org/abs/2108.05080; pp. 1-22.
Korshunova et al. "Fast Face-swap Using Convolutional Neural Networks," IEEE International Conference on Computer Vision (ICCV), Oct. 22-29, 2017, Venice, Italy; pp. 3677-3685.

(56) References Cited

OTHER PUBLICATIONS

Kwon et al. "KoDF: A Large-scale Korean DeepFake Detection Dataset," IEEE/CVF International Conference on Computer Vision, Oct. 10-17, 2021, Montreal, QC, Canada; pp. 10744-10753.

Li et al. "In Ictu Oculi: Exposing AI Created Fake Videos by Detecting Eye Blinking," IEEE International Workshop on Information Forensics and Security (WIFS), Dec. 10-13, 2018, Hong Kong, China; pp. 1-7.

Lutz et al. (Aug. 2021). "DeepFake Detection with Inconsistent Head Poses: Reproducibility and Analysis," located at https://arxiv.org/abs/2108.12715; 10 pages.

Ma et al. "Pixel Codec Avatars," IEEE/CVF Conference on Computer Vision and Pattern Recognition (CVPR), Jun. 20-25, 2021, Nashville, Tennessee; pp. 64-73.

Mittal et al. "Emotions Don't Lie: An Audio-Visual Deepfake DetectionMethod using Affective Cues," 28th ACM International Conference on Multimedia, Oct. 12-16, 2020, Seattle, Washington; 10 pages.

Morgado et al. "Robust Audio-Visual Instance Discrimination," IEEE/CVF Conference on Computer Vision and Pattern Recognition, Jun. 20-25, 2021, Nashville, Tennessee; pp. 12934-12945.

Nirkin et al. "FSGAN: Subject Agnostic Face Swapping and Reenactment," IEEE/CVF International Conference on Computer Vision (ICCV), Oct. 27-Nov. 2, 2019, Seoul, Korea; pp. 7184-7193.

Ojha et al. "Towards Universal Fake Image Detectors thatGeneralize Across Generative Models," IEEE/CVF Conference on Computer Vision and Pattern Recognition (CVPR), Jun. 17-24, 2023, Vancouver, BC, Canada; pp. 24480-24489.

Prajwal et al. "A Lip Sync Expert Is All You Need for Speech to Lip Generation In The Wild," 28th ACM International Conference on Multimedia, Oct. 12-16, 2020, Seattle, Washington; 10 pages.

Radford et al. "Learning Transferable Visual Models From Natural Language Supervision," 38th International Conference on Machine Learning (ICML 2021), Jul. 18-24, 2021, Virtual Conference; 16 pages.

Rossler et al. "FaceForensics++: Learning to Detect Manipulated Facial Images," IEEE/CVF International Conference on Computer Vision Workshop (ICCVW), Oct. 27-28, 2019, Seoul, Korea; pp. 1-11.

Rouditchenko et al. "AVLnet: Learning Audio-Visual Language Representations from Instructional Videos," Annual Conference of the International Speech Communication Association, Aug. 30-Sep. 3, 2021, Brno, Czechia; pp. 1584-1588, Taylor et al. "Cloze Procedure," 1953.

Tong et al. "VideoMAE: Masked Autoencoders are Data-Efficient Learners for Self-Supervised Video Pre-Training," 36th Conference on Neural Information Processing Systems (NeurIPS 2022), Nov. 28-Dec. 9, 2022, New Orleans, Louisiana; pp. 1-25.

Wang et al. "AltFreezing for More General Video Face Forgery Detection," IEEE/CVF Conference on Computer Vision and Pattern Recognition (CVPR), Jun. 17-24, 2023, Vancouver, BC, Canada; pp. 4129-4138.

Wang et al. "FaceX-Zoo: A PyTorch Toolbox for Face Recognition," 29th ACM International Conference on Multimedia, Oct. 20-24, 2021, Chengdu, China; pp. 1-9.

Wang et al. "One-Shot Free-View Neural Talking-Head Synthesis for Video Conferencing," IEEE/CVF Conference on Computer Vision and Pattern Recognition (CVPR), Jun. 20-25, 2021, Nashville, Tennessee; pp. 10039-10049.

Wodajo et al. (Feb. 2021) "Deepfake Video Detection Using Convolutional Vision Transformer," located at https://arxiv.org/abs/2102.11126; pp. 1-9.

Wolf et al. "Face Recognition in Unconstrained Videos with Matched Background Similarity," Conference on Computer Vision and Pattern Recognition (CVPR), Jun. 20-25, 2011, Colorado Springs, Colorado; pp. 529-534.

Wu et al. (Jun. 2023). "Deepfake in the Metaverse: An Outlook Survey," located at https://arxiv.org/abs/2306.07011; pp. 1-8.

Yang et al. "Exposing Deep Fakes Using Inconsistent Head Poses," IEEE International Conference on Acoustics, Speech and Signal Processing (ICASSP), May 12-17, 2019, Brighton, United Kingdom; 4 pages.

Zhao et al. "Exploring Complementarity of Global and Local Spatiotemporal Information for Fake Face Video Detection," IEEE International Conference on Acoustics, Speech and Signal Processing (ICASSP), May 22-27, 2022, Singapore; pp. 2884-2888.

Zheng et al. "Exploring Temporal Coherence for More General Video Face Forgery Detection," IEEE/CVF International Conference on Computer Vision (ICCV), Oct. 10-17, 2021, Montreal, Canada; pp. 15044-15054.

Zhou et al. "Joint Audio-Visual Deepfake Detection," IEEE/CVF International Conference on Computer Vision, Oct. 11-17, 2021, Montreal, BC, Canada; pp. 14800-14809.

Zhou et al. (Aug. 2018). "VisemeNet: Audio-Driven Animator-Centric Speech Animation," ACM Transactions on Graphics (TOG), 37(4): 10 pages.

Zhu et al. "CelebV-HQ: A Large-Scale Video Facial Attributes Dataset," European Conference on Computer Vision (ECCV 2022), Oct. 25-27, 2022, Tel Aviv, Israel; pp. 1-27.

Zhuang et al. "UIA-ViT: Unsupervised Inconsistency-Aware Method based on Vision Transformer for Face Forgery Detection," European Conference on Computer Vision (ECCV 2022), Oct. 23-27, 2022, Tel Aviv, Israel; pp. 1-16.

\* cited by examiner

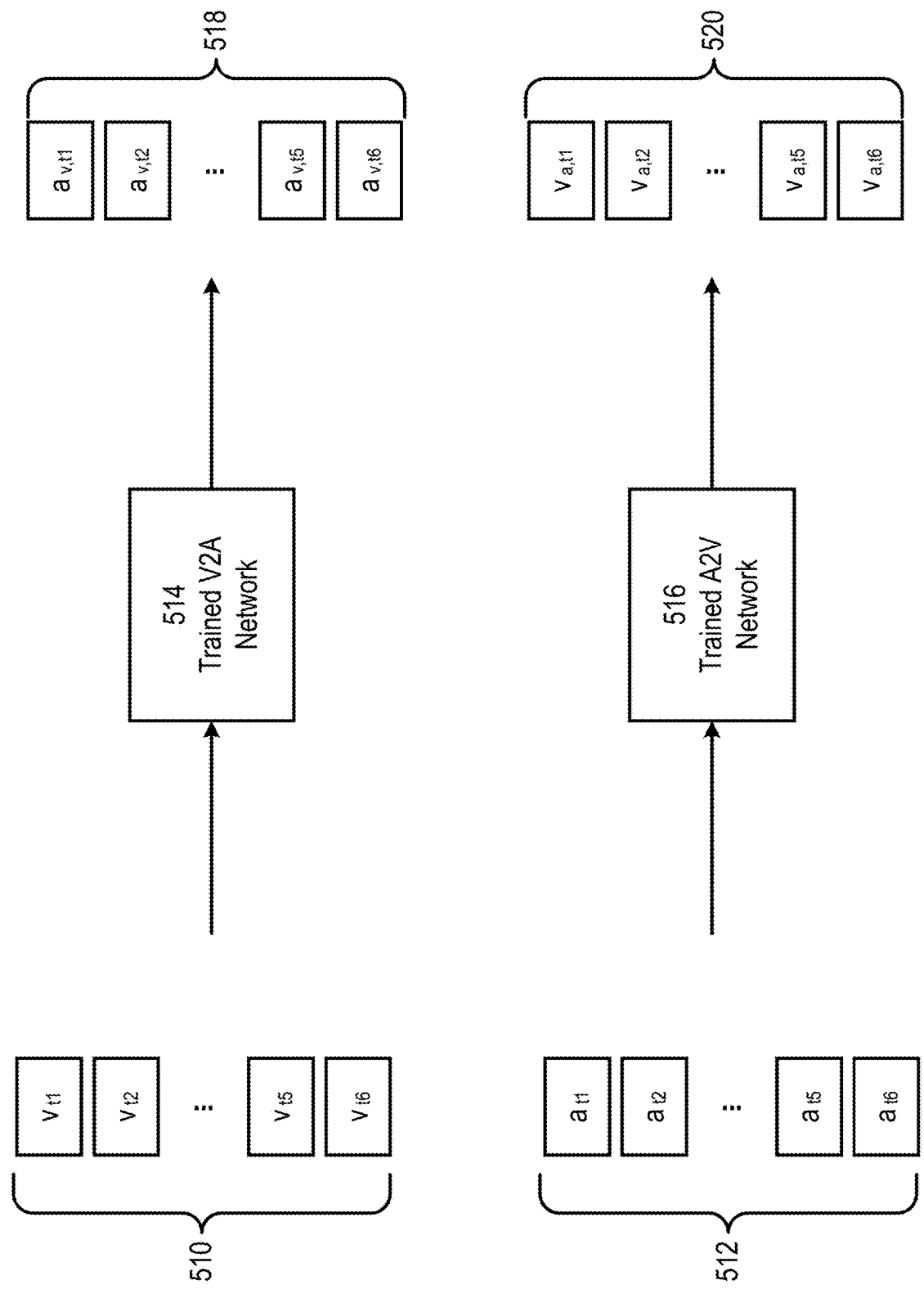

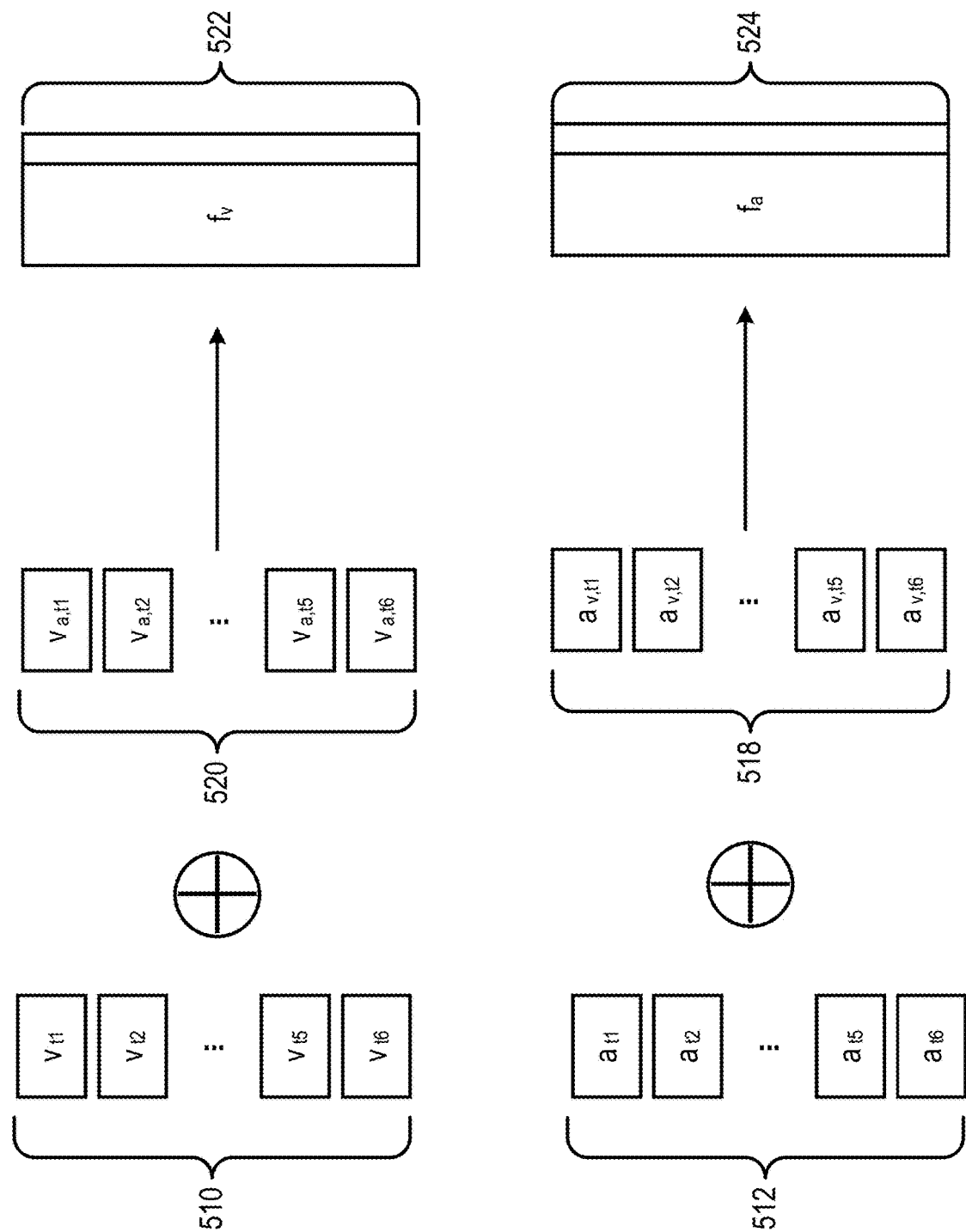

MACHINE-LEARNING-BASED DETECTION OF FAKE VIDEOS

CROSS-REFERENCE TO RELATED APPLICATIONS

This application claims the benefit of U.S. Provisional Application No. 63/600,581, filed Nov. 17, 2023, the entire contents of which are hereby incorporated by reference herein.

FIELD

The present disclosure relates to techniques for detecting fake (e.g., AI-generated) videos.

BACKGROUND

Generative AI technology has enabled the creation of rich, high-quality multimedia content. However, the technology is increasingly being leveraged to defraud, defame, and spread disinformation. The malicious use of generative AI technology therefore poses a major societal threat.

AI-generated videos can be particularly misleading. These videos can include AI-generated audio and real visuals, real audio and AI-generated visuals, or both AI-generated audio and AI-generated visuals. Correspondences between a video's audio data and visual data can indicate whether the video is fake or real. However, many existing techniques for detecting AI-generated videos focus on data of a particular modality (e.g., only audio data or only visual data) and, as a result, are frequently unable to identify as fake videos with real data of that modality but fake data of the other modality. Other techniques use supervised learning to train analytic models to classify videos as real or fake by implicitly capturing audio-visual correspondences. The focus of such models is usually restricted to the specific correspondences present in the training data set, which may cause the models to overlook correspondences that can help detect unseen AI-generated videos.

SUMMARY

Provided are machine-learning-based techniques for training a model to detect fake (e.g., AI-generated or deepfake) videos. The model can include a visual encoder, an audio encoder, an audio-to-visual (A2V) network, a visual-to-audio (V2A) network, and a classifier for classifying videos as real or fake. The encoders and the networks may be trained on real videos by first using the encoders to generate sequences of image embeddings and audio embeddings from image and audio data extracted from input videos and then replacing a subset of each embedding sequence with synthetic embeddings generated by one of the networks using a corresponding subset of the embeddings for the opposite modality. Specifically, a subset of the sequence of image embeddings may be replaced by synthetic image embeddings generated by the A2V network based on a corresponding subset of the audio embeddings and a subset of the sequence of audio embeddings may be replaced by synthetic audio embeddings generated by the V2A network based on a corresponding subset of the image embeddings. From these "cross-modal" representations produced using embeddings from both the audio and visual modalities, the encoders and the networks can learn to capture intrinsic correspondences between the audio and visual modalities in real videos.

Once the encoders and the networks are trained, they may be used to produce cross-modal representations of videos to be classified as real or fake. Training the encoders and the networks using real videos may ensure that, for real videos, the cross-modal representations generated by the encoders and the networks display high audio-visual cohesion and, for fake videos (e.g., videos with fake images, videos with fake audio, or videos with fake images and fake audio), the cross-modal representations generated by the encoders and the network display low audio-visual cohesion. The differences in audio-visual cohesion in representations of real videos generated by the encoders and the networks and in representations of fake videos generated by the encoders and the networks can be exploited to train the classifier to distinguish between real videos and fake videos with high accuracy.

The disclosed techniques provide numerous technical advantages. In various embodiments, the techniques may improve the functioning of a computer by reducing processing power, battery usage, and memory requirements associated with detecting fake videos. The provided cross-modal learning method may produce trained models with broad focuses that can accurately analyze a wide variety of videos. In particular, classifiers trained using the provided cross-modal learning method may be capable of interpreting a range of audio-visual correspondences and, as a result, may perform accurately on videos having fake audio, videos having fake visuals, and videos having both fake audio and fake visuals.

A method for training a model comprising a visual encoder, an audio encoder, an audio-to-visual (A2V) network, a visual-to-audio (V2A) network, and a classifier for classifying videos as real or fake can comprise generating a sequence of image tiles from image data from an input video and generating a plurality of data segments representing audio data from the input video. A sequence of image embeddings can be generated based on the sequence of image tiles using the visual encoder. Similarly, a sequence of audio embeddings can be generated based on the sequence of data segments using the audio encoder. The V2A network can be used to transform a first subset of the sequence of image embeddings into one or more synthetic audio embeddings and the A2V network can be used to transform a first subset of the sequence of audio embeddings into one or more synthetic image embeddings. The sequence of image embeddings can then be updated by replacing a second subset of the sequence of image embeddings with the one or more synthetic image embeddings. Likewise, the sequence of audio embeddings can be updated by replacing a second subset of the sequence of audio embeddings with the one or more synthetic audio embeddings. The visual encoder, the audio encoder, the V2A network, and the A2V network can be trained based on the updated sequence of image embeddings and the updated sequence of audio embeddings. The classifier can be trained to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

The first subset of the sequence of image embeddings can include half of the image embeddings, and the first subset of the sequence of audio embeddings can include half of the audio embeddings. In some embodiments, the first subset of the sequence of image embeddings and the first subset of the sequence of audio embeddings are randomly selected. The first subset of the sequence of image embeddings can correspond to a first set of time points in the input video, and the first subset of the sequence of audio embeddings can correspond to a second set of time points in the input video different from the first set of time points. The second subset of the sequence of image embeddings can correspond to the second set of time points, and the second subset of the sequence of audio embeddings can correspond to the first set of time points.

Training the visual encoder, the audio encoder, the V2A network, and the A2V network based on the updated sequence of image embeddings and the updated sequence of audio embeddings can include decoding the updated sequence of image embeddings to produce a reconstruction of the sequence of image tiles and decoding the updated sequence of audio embeddings to produce a reconstruction of the plurality of data segments. The updated sequence of image embeddings may be decoded using a visual decoder and the updated sequence of audio embeddings may be decoded using an audio decoder. In some embodiments, training the visual encoder, the audio encoder, the V2A network, and the A2V network based on the updated sequence of image embeddings and the updated sequence of audio embeddings further comprises computing a dual-objective loss, wherein a first objective of the dual-objective loss depends on the sequence of audio embeddings and the sequence of image embeddings and a second objective of the dual-objective loss depends on the sequence of image tiles, the plurality of data segments, the reconstruction of the sequence of image tiles, and the reconstruction of the plurality of data segments.

Training the classifier to classify videos as real or fake using the trained visual encoder, the trained audio encoder, the trained V2A network, and the trained A2V network can include generating a second sequence of image tiles from image data from a labeled training video comprising a label indicating whether the labeled training video is real or fake, generating a second plurality of data segments representing audio data from the labeled training video, generating a second sequence of image embeddings based on the second sequence of image tiles using the trained visual encoder, generating a second sequence of audio embeddings based on the second sequence of data segments using the trained audio encoder, transforming, using the trained V2A network, the second sequence of image embeddings into a sequence of synthetic audio embeddings, transforming, using the trained A2V network, the second sequence of audio embeddings into a sequence synthetic image embeddings, concatenating the second sequence of image embeddings and the sequence of synthetic image embeddings to produce a combined sequence of image embeddings, concatenating the second sequence of audio embeddings and the sequence of synthetic audio embeddings to produce a combined sequence of audio embeddings, and classifying the labeled training video as real or fake based on the combined sequence of audio embeddings and the combined sequence of image embeddings. Training the classifier to classify videos as real or fake using the trained visual encoder, the trained audio encoder, the trained V2A network, and the trained A2V network can further comprise computing a cross-entropy loss objective using label indicating whether the labeled training video is real or fake. The classifier can include an audio mode patch reduction network, a visual mode patch reduction network, and a classifier head.

A number of image tiles in the sequence of image tiles and a number of data segments in the sequence of data segments can be determined based on a sampling frequency of the image data, a sampling frequency of the audio data, and a time duration of the input video. The input video may show a human face.

In some embodiments, the method further comprises providing the trained model with a second input video and classifying the second input video as real or fake using the trained model. The second input video can include real audio data and AI-generated image data, real image data and AI-generated audio data, or AI-generated image data and AI-generated audio data.

A system for training a model comprising a visual encoder, an audio encoder, an audio-to-visual (A2V) network, a visual-to-audio (V2A) network, and a classifier for classifying videos as real or fake can include one or more processors configured to: generate a sequence of image tiles from image data from an input video, generate a plurality of data segments representing audio data from the input video, generate a sequence of image embeddings based on the sequence of image tiles using the visual encoder, generate a sequence of audio embeddings based on the sequence of data segments using the audio encoder, transform, using the V2A network, a first subset of the sequence of image embeddings into one or more synthetic audio embeddings, transform, using the A2V network, a first subset of the sequence of audio embeddings into one or more synthetic image embeddings, update the sequence of image embeddings by replacing a second subset of the sequence of image embeddings with the one or more synthetic image embeddings, update the sequence of audio embeddings by replacing a second subset of the sequence of audio embeddings with the one or more synthetic audio embeddings, train the visual encoder, the audio encoder, the V2A network, and the A2V network based on the updated sequence of image embeddings and the updated sequence of audio embeddings, train the classifier to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

A non-transitory computer readable storage medium storing instructions for training a model comprising a visual encoder, an audio encoder, an audio-to-visual (A2V) network, a visual-to-audio (V2A) network, and a classifier for classifying videos as real or fake that, when executed by one or more processors of a computer system, can cause the computer system to: generate a sequence of image tiles from image data from an input video, generate a plurality of data segments representing audio data from the input video, generate a sequence of image embeddings based on the sequence of image tiles using the visual encoder, generate a sequence of audio embeddings based on the sequence of data segments using the audio encoder, transform, using the V2A network, a first subset of the sequence of image embeddings into one or more synthetic audio embeddings, transform, using the A2V network, a first subset of the sequence of audio embeddings into one or more synthetic image embeddings, update the sequence of image embeddings by replacing a second subset of the sequence of image embeddings with the one or more synthetic image embeddings, update the sequence of audio embeddings by replacing a second subset of the sequence of audio embeddings with the one or more synthetic audio embeddings, train the visual encoder, the audio encoder, the V2A network, and the A2V network based on the updated sequence of image embeddings and the updated sequence of audio embeddings, train the classifier to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

BRIEF DESCRIPTION OF THE FIGURES

The patent or application file contains at least one drawing executed in color. Copies of this patent or patent application publication with color drawing(s) will be provided by the Office upon request and payment of the necessary fee.

The following figures show various systems, methods, and apparatuses detecting fake videos. The systems, methods, and apparatuses shown in the figures may have any one or more of the characteristics described herein.

FIG. 5B shows a schematic of second portion of a process for training a classifier to detect fake videos, according to some embodiments.

FIG. 5C shows a schematic of third portion of a process for training a classifier to detect fake videos, according to some embodiments.

DETAILED DESCRIPTION

Figure 1:
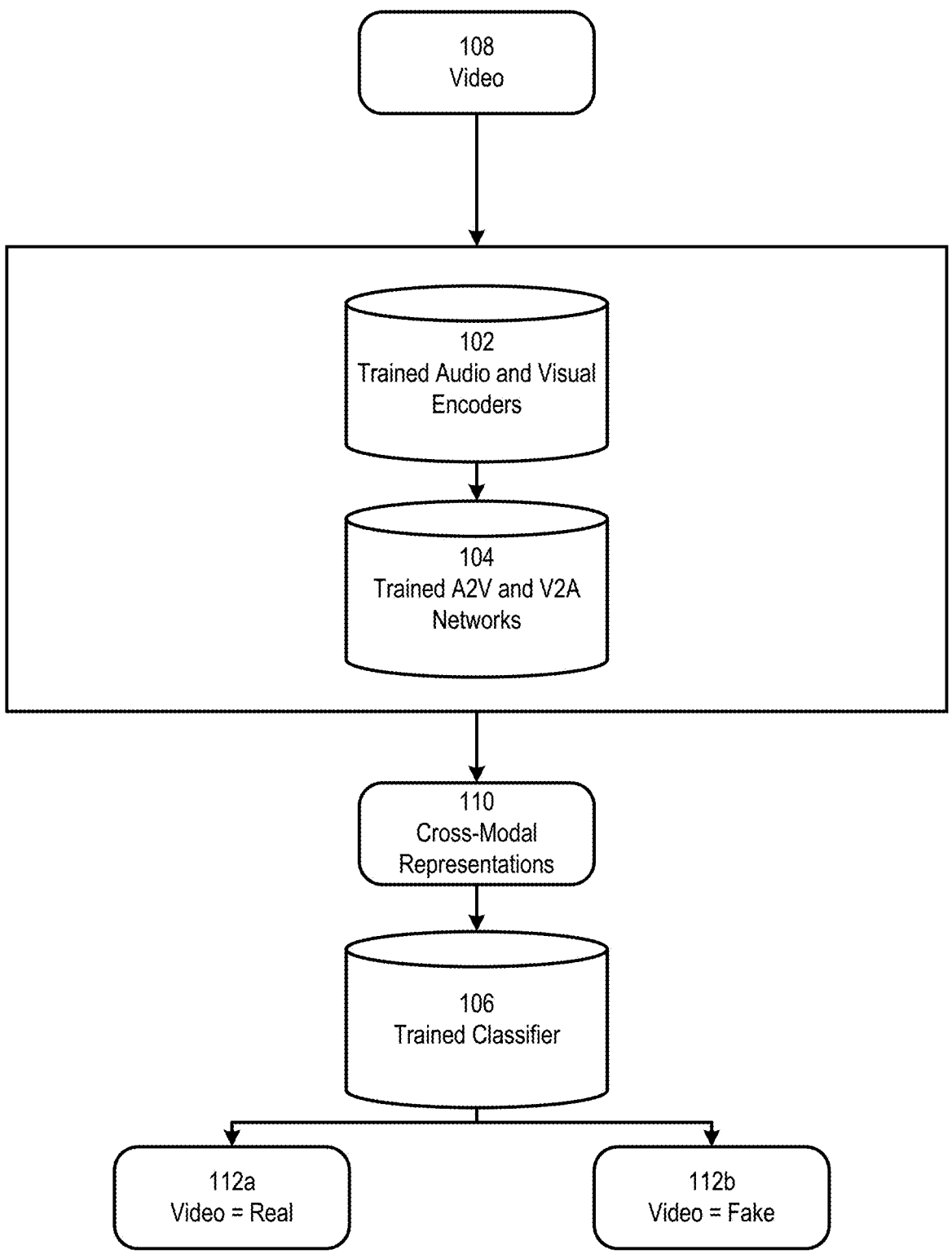
FIG. 1 shows a block diagram of a system for detecting fake videos, according to some embodiments.

Provided are machine-learning-based techniques for training a model to detect fake (e.g., AI-generated or deepfake) videos. The model can include a visual encoder, an audio encoder, an audio-to-visual (A2V) network, a visual-to-audio (V2A) network, and a classifier for classifying videos as real or fake. The encoders and the networks may be trained on real videos by first using the encoders to generate sequences of image embeddings and audio embeddings from image and audio data extracted from input videos and then replacing a subset of each embedding sequence with synthetic embeddings generated by one of the networks using a corresponding subset of the embeddings for the opposite modality. Specifically, a subset of the sequence of image embeddings may be replaced by synthetic image embeddings generated by the A2V network based on a corresponding subset of the audio embeddings and a subset of the sequence of audio embeddings may be replaced by synthetic audio embeddings generated by the V2A network based on a corresponding subset of the image embeddings. From these "cross-modal" representations produced using embeddings from both the audio and visual modalities, the encoders and the networks can learn to capture intrinsic correspondences between the audio and visual modalities in real videos.

Once the encoders and the networks are trained, they may be used to produce cross-modal representations of videos to be classified as real or fake. Training the encoders and the networks using real videos may ensure that, for real videos, the cross-modal representations generated by the encoders and the networks display high audio-visual cohesion and, for fake videos (e.g., videos with fake images, videos with fake audio, or videos with fake images and fake audio), the cross-modal representations generated by the encoders and the network display low audio-visual cohesion. The differences in audio-visual cohesion in representations of real videos generated by the encoders and the networks and in representations of fake videos generated by the encoders and the networks can be exploited to train the classifier to distinguish between real videos and fake videos with high accuracy.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The provided methods, systems, apparatuses, and non-transitory computer readable storage media may identify videos as real or fake using a classifier that has been trained using cross-modal video representations generated by models that have learned audio-visual correspondences inherent to real videos. These models may be trained via a self-supervised learning paradigm that employs a contrastive learning objective and a complementary masking and fusion strategy that sits within an autoencoding objective. The complementary masking and fusion strategy may take uni-modal audio and visual embeddings and systematically mask them to force the learning of advanced embeddings via reconstruction. To instill cross-modal dependency, tokens from one modality may be used to learn the masked embeddings of the other modality via cross-modal token conversion networks. Training the encoders and cross-modal networks on real videos may compel the models to learn dependencies between real audio and corresponding real visual data. The high audio-visual correspondences in the representations of real videos generated by the trained models may be leveraged to train the classifier to distinguish between real and fake videos by exploiting the lack of audio-visual cohesion in synthesized video samples.

An exemplary system for detecting fake videos is illustrated in FIG. 1. The system may include trained audio and visual encoders 102, trained audio-to-visual (A2V) and visual-to-audio (V2A) networks 104, and a trained classifier 106. Audio and visual encoders 102 and A2V and V2A networks 104 may generate cross-modal representations of videos using audio-visual correspondences learned from training on real videos. Classifier 106 may have been trained using cross-modal representations produced by audio and visual encoders 102 and A2V and V2A networks 104 to classify a video as real or fake based on the video's audio-visual cohesion.

To detect whether a given video 108 is real or fake, audio data and visual data from video 108 may be provided to trained audio and visual encoders 102, which may generate audio embeddings from the audio data and image embeddings from the visual data. The audio and image embeddings may then be passed to trained A2V and V2A networks 104, at which point the trained A2V network may synthesize a set of image embeddings using the audio embeddings generated by the trained audio encoder and the trained V2A network may synthesize a set of audio embeddings using the image embeddings generated by the trained visual encoder. The synthetic image embeddings generated by the A2V network may be concatenated with the image embeddings generated by the visual encoder while preserving the temporal position of each embedding in its respective sequence. Similarly, the synthetic audio embeddings generated by the V2A network may be concatenated with the audio embeddings generated by the audio encoder while preserving the temporal position of each embedding in its respective sequence. These concatenated sets of embeddings may then be provided as input to classifier 106, which may output either an indication 112a that the video is real or an indication 112b that the video is fake.

Figure 2:
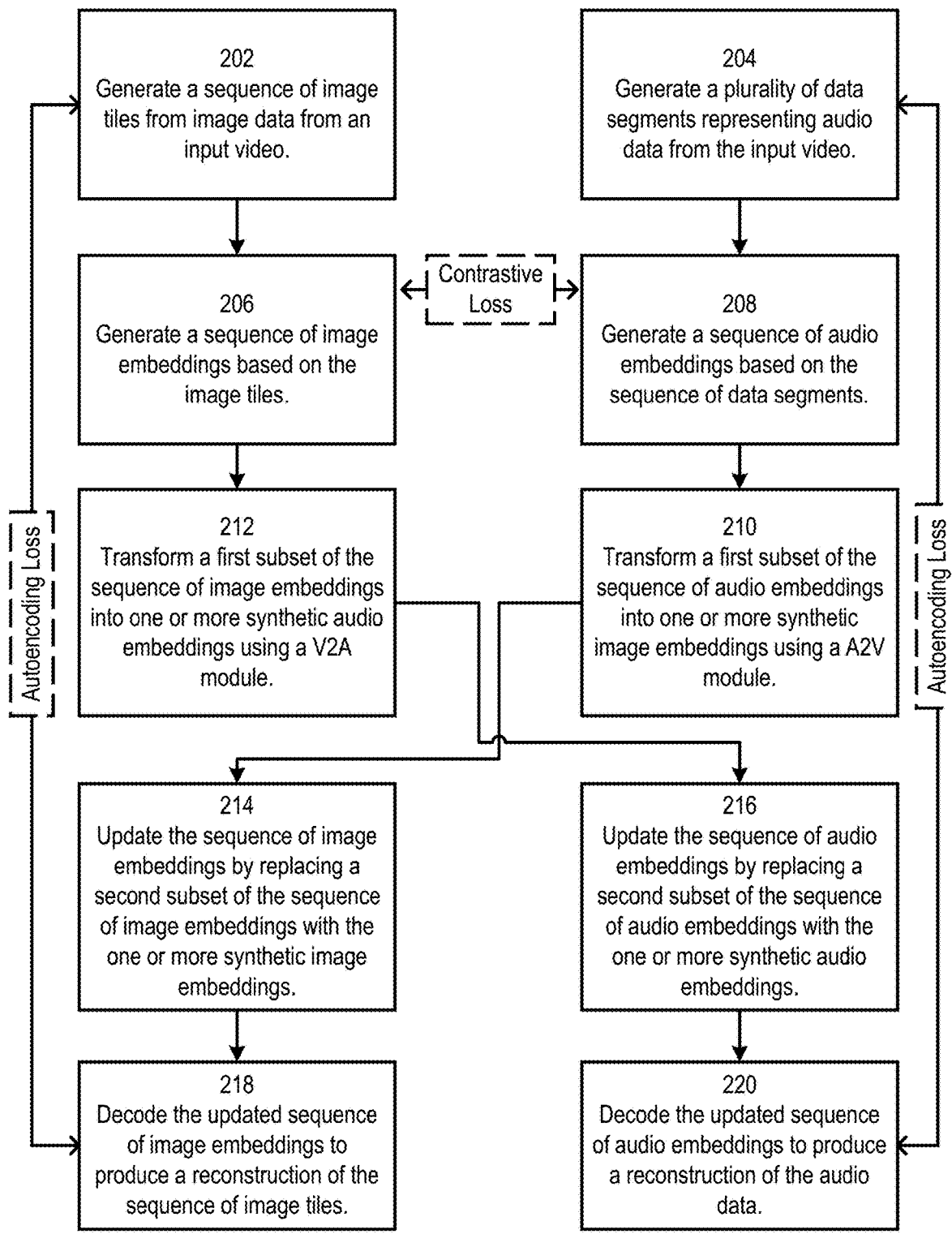
FIG. 2 shows a method for training an audio-to-visual (A2V) network and a visual-to-audio (V2A) network to acquire cross-modal representations of videos, according to some embodiments.

FIG. 2 provides an exemplary method 200 for training an audio encoder, a visual encoder, an audio-to-visual (A2V) network, and a visual-to-audio (V2A) network. Method 200 may be executed using a computer system and may produce trained audio and visual encoders and trained A2V and V2A networks such as audio and visual encoders 102 and A2V and V2A networks 104 of system 100 shown in FIG. 1. The computer system used to perform method 200 may, for example, comprise one or more electronic devices implementing a software platform. In other examples, the computer system may be a client-server system, in which case the blocks of method 200 may be divided up between the server and a client device, between the server and multiple client devices, using only a client device, or using only multiple client devices.

In various embodiments of method 200, some blocks are, optionally, combined, the order of some blocks is, optionally, changed, and some blocks are, optionally, omitted. In some examples, additional steps may be performed in combination with the blocks of method 200. Accordingly, the operations as illustrated (and described in greater detail below) are exemplary by nature and, as such, should not be viewed as limiting.

A preprocessing stage may be performed prior to executing method 200. In the preprocessing stage, an input video may be processed to extract image data and audio data. The image data and the audio data may respectively comprise visual frames and audio waveforms extracted from the input video at predetermined sampling rates. In various embodiments, the sampling rate at which visual frames are extracted from the input video is between 24 and 120 fps, for example 24 fps, 30 fps, 60 fps, or 120 fps. The sampling rate at which audio waveforms are extracted from the input video may be between 8 and 48 kHz, for example 8 kHz, 16 kHz, 22.1 kHz, 44.1 kHz, or 48 kHz.

The extracted audio waveforms that make up the audio data may be converted into spectrograms (e.g., log-mel spectrograms with L frequency bins). Optionally, the extracted image data and the extracted audio data can be further processed to remove data that has minimal impact on audio-visual correspondence. For example, background regions of a visual frame in the image data that contribute minimally to the video's audio may be cropped or otherwise eliminated. If, for instance, the input video shows a human face while the human is speaking, the visual frames that make up the image data for said video may be cropped to select the facial regions and eliminate the background. This may be accomplished using any suitable technique, for example a facial recognition toolbox such as the PyTorch toolbox FaceX-Zoo.

After the image data and the audio data have been extracted and processed, a sequence of image tiles may be generated from the image data (step 202 of method 200) and a plurality of audio data segments may be generated from the audio data (step 204 of method 200). That is, for an input video x with a total time duration T that has audio data components $x_a \in \mathbb{R}^{T_a \times L}$ and image data components $x_v \in \mathbb{R}^{T_v \times C \times H \times W}$, a set of N equal temporal audio data segments $X_a = \{X_{a,t_i}\}_{i=1}^{N}$ may be generated from the audio data and a set of N equal temporal image tiles $X_v = \{X_{v,t_i}\}_{i=1}^{N}$ may be generated from the image data. $(T_a, L)$ may denote the number of audio frames and the number of frequency bins in the spectrograms for the audio waveforms, respectively, while $(T_v, H, W, C)$ may denote the number of visual frames, height, width, and number of channels in the image data, respectively. $T_a$ and $T_v$ may be such that:

$$T_v \cdot n_v = T_a \cdot n_a = T \qquad \text{(Equation 1)}$$

where $n_v$ is the sampling rate at which image frames were extracted from the input video and $n_a$ is the sampling rate at which audio waveforms were extracted from the input video. To generate $X_a$, the audio data components $x_a$ may be tokenized using P×P non-overlapping 2D patches (e.g., similar to Audio-MAE, described in: Po-Yao Huang, Hu Xu, Juncheng Li, Alexei Baevski, Michael Auli, Wojciech Galuba, Florian Metze, and Christoph Feichtenhofer. Masked autoencoders that listen. In *Advances in Neural Information Processing Systems*, 35:28708-28720, 2022). For example, the audio data components may be tokenized using 16×16, 14×14, or 32×32 non-overlapping 2D patches. To generate $X_v$, the image data components $x_v$ may be tokenized using 2×P×P (e.g., 2×16×16) non-overlapping 3D spatio-temporal patches (e.g., similar to MARLIN, described in: Zhixi Cai, Shreya Ghosh, Kalin Stefanov, Abhinav Dhall, Jianfei Cai, Hamid Rezatofighi, Reza Haffari, and Munawar Hayat. Marlin: Masked autoencoder for facial video representation learning. In *Proceedings of the IEEE/CVF Conference on Computer Vision and Pattern Recognition*, pages 1493-621 1504, 2023).

The number N of temporal slices may be determined empirically. In some embodiments, the number N of temporal slices is greater than or equal to 2, 4, 6, 8, 10, 12, 14, 16, 18, or 20. In other embodiments, the number N of temporal slices is less than or equal to 1000, 500, 100, 90, 80, 70, 60, or 50. Tokenization of the audio data components and the image data components may be performed such that the temporal correspondence of the audio data segments and the image tiles is preserved, i.e., such that $x_{a,t_i}$ and $x_{v,t_i}$ correspond to the same time interval.

After the sequence of image tiles is generated, a sequence of image embeddings may be generated (step 206 of method 200). Likewise, after the plurality of audio data segments is generated, a sequence of audio embeddings may be generated (step 208 of method 200). The sequence of image embeddings may be generated by a visual encoder $E_v$ and the sequence of audio embeddings may be generated by an audio encoder $E_a$. The visual encoder $E_v$ may encode the image tiles $X_v$ and output uni-modal features v, where:

$$v = \{v_{t_i}\}_{i=1}^{N} = E_v(X_v + pos_v^e) \qquad \text{(Equation 2)}$$

In Equation 2, $pos_v^e$ indicates the learnable positional embedding. Similarly, the audio encoder $E_a$ may encode the image tiles $X_a$ and output uni-modal features a, where:

$$a = \{a_{t_i}\}_{i=1}^{N} = E_a(X_a + pos_a^e) \qquad \text{(Equation 3)}$$

and $pos_a^e$ indicates the learnable positional embedding.

Figure 3A:
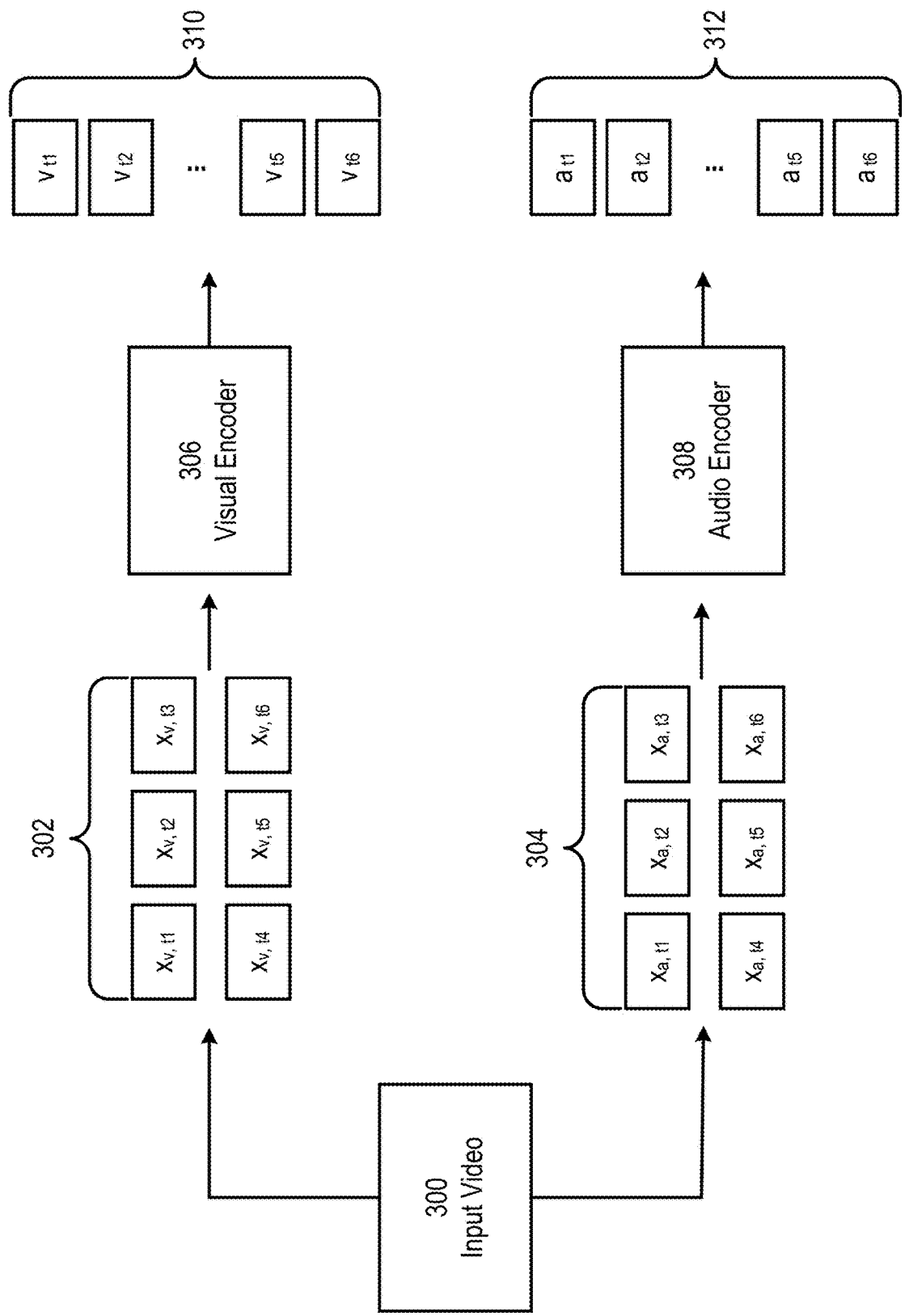
FIG. 3A shows a schematic of a process for generating sequences of audio embeddings and visual embeddings from an input video, according to some embodiments.

A schematic of a process for generating sequences of audio embeddings and visual embeddings from an input video (e.g., of a process corresponding to steps 202-208 of method 200), is illustrated in FIG. 3A. As shown, a sequence of image tiles 302 and a plurality of audio data segments 304 may be generated from an input video 300. Image tiles 302 may be provided to a visual encoder 306, which may output a sequence of image embeddings 310. Audio data segments 304 may be provided to an audio encoder 308, which may output a sequence of audio embeddings 312.

Returning to FIG. 2, after the sequence of image embeddings and the sequence of audio embeddings are generated, a first subset of the sequence of audio embeddings may be transformed into one or more synthetic image embeddings using an audio-to-visual (A2V) network (step 210 of method 200) and a first subset of the sequence of image embeddings may be transformed into one or more synthetic audio embeddings using a visual-to-audio (V2A) network (step 212 of method 200). The first subset of the sequence of audio embeddings and the first subset of the sequence of image embeddings may include half of the audio embeddings and half of the image embeddings, respectively. The first subset of the sequence of image embeddings may correspond to a first set of time points (e.g., temporal slices) in the input video, while the first subset of the sequence of audio embeddings may correspond to a second set of time points (e.g., temporal slices) in the input video that differ from the first set of time points.

To acquire the first subset of the sequence of image embeddings and the first subset of the sequence of audio embeddings, a subset $\hat{N}$ of the N temporal slices may be selected. This selection may be random and may be performed using any suitable randomized selection technique. The first subset of the sequence of image embeddings may correspond to the selected subset $\hat{N}$ of the N temporal slices, while the first subset of the sequence of audio embeddings may correspond to the complement $(\hat{N})^C$ of the selected subset of the N temporal slices. In this case, the image embeddings that are not in the first subset of the sequence of image embeddings may belong to a second subset of the sequence of image embeddings that corresponds to the complement $(\hat{N})^C$ of the selected subset of the N temporal slices, and the audio embeddings that are not in the first subset of the sequence of audio embeddings may belong to a second subset of the sequence of audio embeddings that corresponds to the selected subset $\hat{N}$ of the N temporal slices. Alternatively, the first subset of the sequence of image embeddings may correspond to the complement $(\hat{N})^C$ of the selected subset of the N temporal slices, while the first subset of the sequence of audio embeddings may correspond to the selected subset of the N temporal slices. In this case, the image embeddings that are not in the first subset of the sequence of image embeddings may belong to a second subset of the sequence of image embeddings that corresponds to the selected subset of the N temporal slices, and the audio embeddings that are not in the first subset of the sequence of audio embeddings may belong to a second subset of the sequence of audio embeddings that corresponds to the complement $(\hat{N})^C$ of the selected subset of the N temporal slices.

A complementary masking process may be used to mask the image embeddings that are not in the first subset of the sequence of image embeddings and to mask the audio embeddings that are not in the first subset of the sequence of audio embeddings. If the first subset of the sequence of image embeddings corresponds to the selected subset $\hat{N}$ of the N temporal slices, then the image embeddings in the second subset of the sequence of image embeddings corresponding to the complement $(\hat{N})^C$ of the selected subset of the N temporal slices may be masked. In this case, the first subset of the sequence of audio embeddings corresponds to the complement $(\hat{N})^C$ of the selected subset of the N temporal slices, so the second subset of the sequence of audio embeddings corresponding to the selected subset $\hat{N}$ of the N temporal slices may be masked. Alternatively, if the first subset of the sequence of image embeddings corresponds to the complement $(\hat{N})^C$ of the selected subset of the N temporal slices, then the image embeddings in the second subset of the sequence of image embeddings corresponding to the selected subset $\hat{N}$ of the N temporal slices may be masked. In this case, the first subset of the sequence of audio embeddings corresponds to the selected subset $\hat{N}$ of the N temporal slices, so the second subset of the sequence of audio embeddings corresponding to complement $(\hat{N})^C$ of the selected subset of the N temporal slices may be masked.

Masking of the image embeddings that are not in the first subset of the sequence of image embeddings may be performed using a visual masking module $M_v$ and masking of the audio embeddings that are not in the first subset of the sequence of audio embeddings may be performed using an audio masking module $M_a$. The visible image embeddings following masking (that is, the unmasked image embeddings) may make up the first subset of the sequence of image embeddings and may be given by Equation 4:

$$v_{vis} = M_v \odot v \quad \text{(Equation 4)}$$

The masked image embeddings may be the image embeddings that are not in the first subset of the sequence of image embeddings (that is, the image embeddings in the second subset of image embeddings) and may be given by Equation 5:

$$v_{msk} = (\neg M_v) \odot v \quad \text{(Equation 5)}$$

In Equations 4-5, $\odot$ may represent the Hadamard product and $\neg$ may represent the logical NOT operator.

Similarly, the visible audio embeddings following masking (that is, the unmasked audio embeddings) may make up the first subset of the sequence of audio embeddings and may be given by Equation 6:

$$a_{vis} = M_a \odot a \quad \text{(Equation 6)}$$

The masked audio embeddings may be the audio embeddings that are not in the first subset of the sequence of audio embeddings (that is, the audio embeddings in the second subset of audio embeddings) and may be given by Equation 7:

$$a_{msk} = (\neg M_a) \odot a \quad \text{(Equation 7)}$$

In Equations 6-7, $\odot$ may represent the Hadamard product and $\neg$ may represent the logical NOT operator.

The visual mask and the audio mask may be complementary binary masks—that is, $(M_a, M_v) \in \{0,1\}$ such that $M_a=1$ for time points where $M_v=0$ and vice versa. In other words, for every masked audio embedding, the corresponding image embedding may be visible (i.e., an element of the first subset) and vice versa.

Figure 3B:
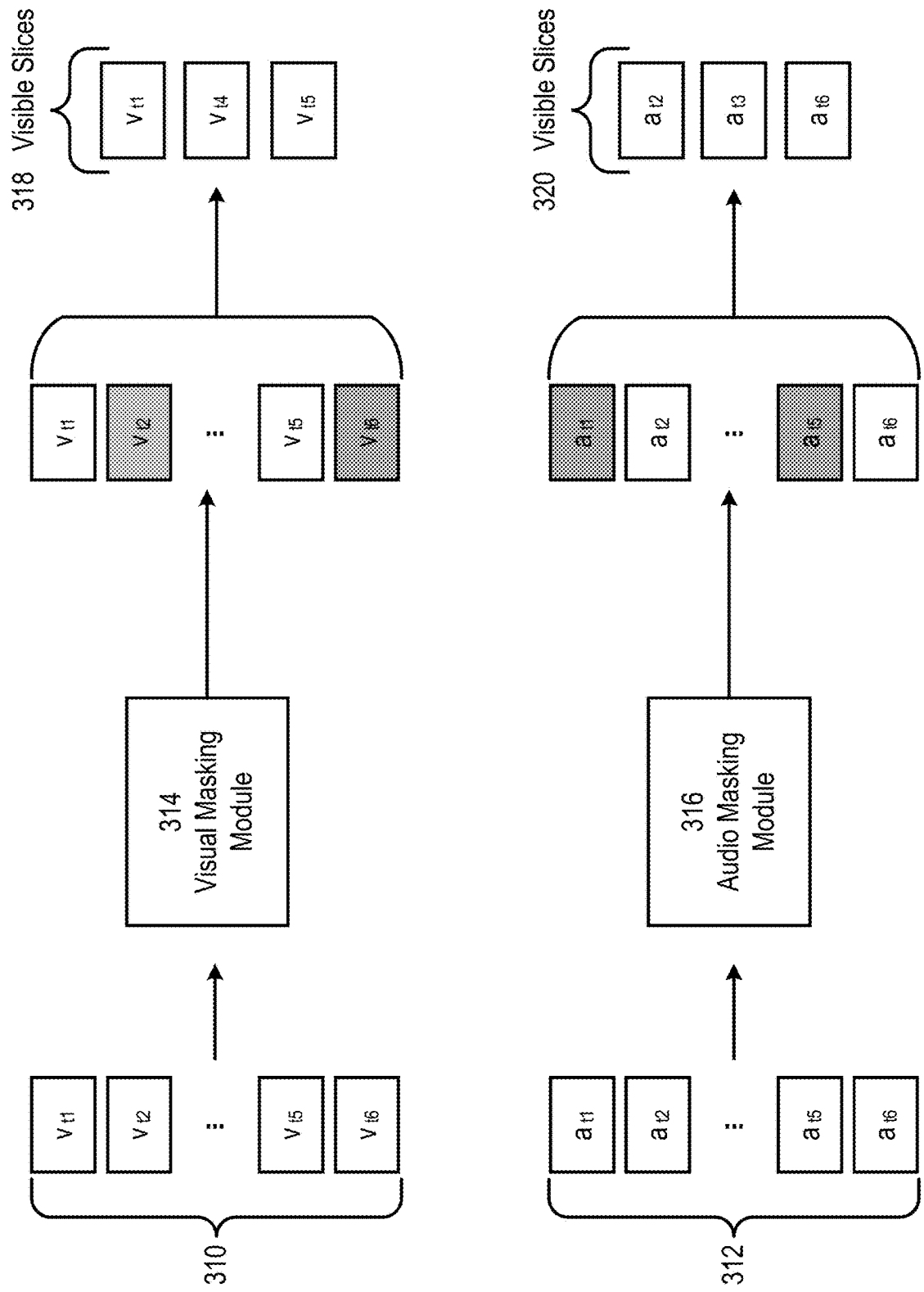
FIG. 3B shows a schematic of a complementary masking process, according to some embodiments.

A schematic of a complementary masking process is illustrated in FIG. 3B. As shown, the sequence of image embeddings 310 may be provided to a visual masking module 314, which may mask a portion of the sequence of image embeddings 310 and output a first subset of visible image embeddings 318. Likewise, the sequence of audio embeddings 312 may be provided to an audio masking module 316, which may mask a portion of the sequence of audio embeddings 312 and output a first subset of visible audio embeddings 320. The temporal slices corresponding to the visible image embeddings 318 may be complementary to the temporal slices corresponding to the visible audio embeddings 320.

Transforming the first subset of the sequence of image embeddings and the first subset of the sequence of audio embeddings (steps 210 and 212 of method 200 shown in FIG. 2) may be performed using a feature fusion process. The A2V network that transforms the first subset of the sequence of audio embeddings into one or more synthetic image embeddings may be an A2V network that has been trained to create synthetic image embeddings $v_a$ that are cross-modal temporal counterparts to the first subset of the sequence of audio embeddings. Specifically, the A2V network may be trained to create cross-modal temporal counterparts $v_a = A2V(a_{vis})$ to the unmasked/visible audio embeddings $a_{vis}$). That is, in some embodiments, $$v_a = \{v_{t_i,a} = A2V(a_{t_i}) \forall\, t_i \text{ where } a_{t_i} \in a_{vis}\} \quad \text{(Equation 8)}$$

Likewise, the V2A network that transforms the first subset of the sequence of image embeddings into one or more synthetic audio embeddings may be a trained V2A network that has been trained to create synthetic audio embeddings $a_v$ that are cross-modal temporal counterparts to the first subset of the sequence of image embeddings. Specifically, the V2A network may be trained to create cross-modal temporal counterparts $a_v = V2A(v_{vis})$ to the unmasked/visible audio embeddings $v_{vis}$. That is, in some embodiments, $$a_v = \{a_{t_i,v} = V2A(v_{t_i}) \forall\, t_i \text{ where } v_{t_i} \in v_{vis}\} \quad \text{(Equation 9)}$$

Each of the A2V and V2A networks may comprise a single layer multilayer perceptron (MLP) to match the number of tokens of the other modality followed by a single transformer block.

Once the synthetic image embeddings have been generated using the A2V network, the sequence of image embeddings may be updated by replacing the second subset of the sequence of image embeddings (i.e., the subset of the image embeddings that are not in the first subset, e.g., the subset $v_{msk}$ of the sequence of image embeddings that were masked) with the synthetic image embeddings (step 214 of method 200). Similarly, once the synthetic audio embeddings are generated using the V2A network, the sequence of audio embeddings may be updated by replacing the second subset of the sequence of audio embeddings (i.e., the subset of the audio embeddings that are not in the first subset, e.g., the subset $a_{msk}$ of the sequence of audio embeddings that were masked) with the synthetic audio embeddings (step 216 of method 200).

The sequences of image embeddings and audio embeddings may be updated using cross-modal fusion that replaces the second subsets of each sequence with cross-modal slices generated from the corresponding slices in the other modality. For example, the sequence of audio embeddings a may be updated by replacing each masked slice $a_{msk}$ with the corresponding slice of the same temporal index in the cross-modal vector $a_v$ given by the V2A network to form an updated sequence of audio embeddings a', and the sequence of image embeddings v may be updated by replacing each masked slice $v_{msk}$ with the corresponding slice of the same temporal index in the cross-modal vector $v_a$ given by the A2V network to form an updated sequence of image embeddings v'.

Figure 3C:
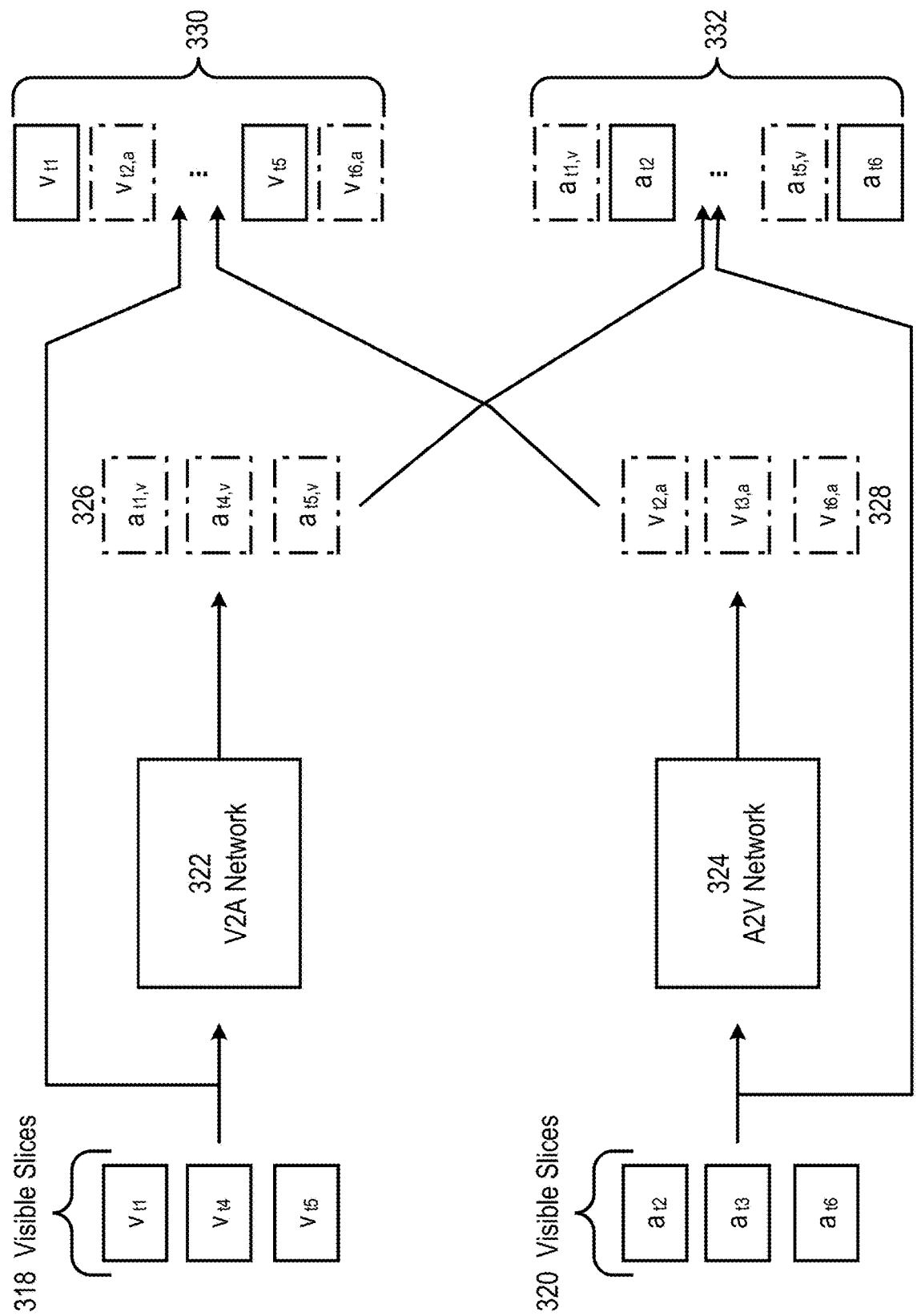
FIG. 3C shows a schematic of a feature fusion process for generating cross-modal representations, according to some embodiments.

A schematic of a cross-modal fusion process (e.g., a process corresponding to steps 210-216 of method 200) is illustrated in FIG. 3C. The subset of visible image embeddings 318 may be provided to a V2A network 322, which may generate synthetic audio embeddings 326 corresponding to the same temporal slices as visible image embeddings 318. Likewise, the subset of visible audio embeddings 320 may be provided to an A2V network 320, which may generate synthetic image embeddings 328 corresponding to the same temporal slices as visible audio embeddings 320. Synthetic audio embeddings 326 may replace the subset of masked audio embeddings (see FIG. 3B) to form an updated sequence of audio embeddings 332 and synthetic image embeddings 328 may replace the subset of masked image embeddings (see FIG. 3B) to form an updated sequence of image embeddings 330.

After the sequence of image embeddings has been updated, it may be input into a visual decoder $G_v$, which may decode the updated sequence of image embeddings to produce a reconstruction $X_v^R$ of the sequence of image titles $X_v$ (step 218 of method 200). Similarly, after the sequence of audio embeddings has been updated, it may be input into an audio decoder $G_a$, which may decode the updated sequence of audio embeddings to produce a reconstruction $X_a^R$ of the plurality of audio data segments $X_a$ (step 220 of method 200). The decoders may use a transformer-based architecture and may be configured to utilize the mix of uni-modal slices and cross-modal slices present in the updated sequence of image embeddings and the updated sequence of audio embeddings to generate reconstructions for the visual modality and the audio modality. In some embodiments, $$X_v^R = G_v(v' + pos_v^g) \qquad \text{(Equation 10)}$$

and $$X_a^R = G_a(a' + pos_a^g) \qquad \text{(Equation 11)}$$

where $pos_v^g$ and $pos_a^g$ are the learnable positional embeddings for the visual modality and the audio modality, respectively.

Figure 3D:
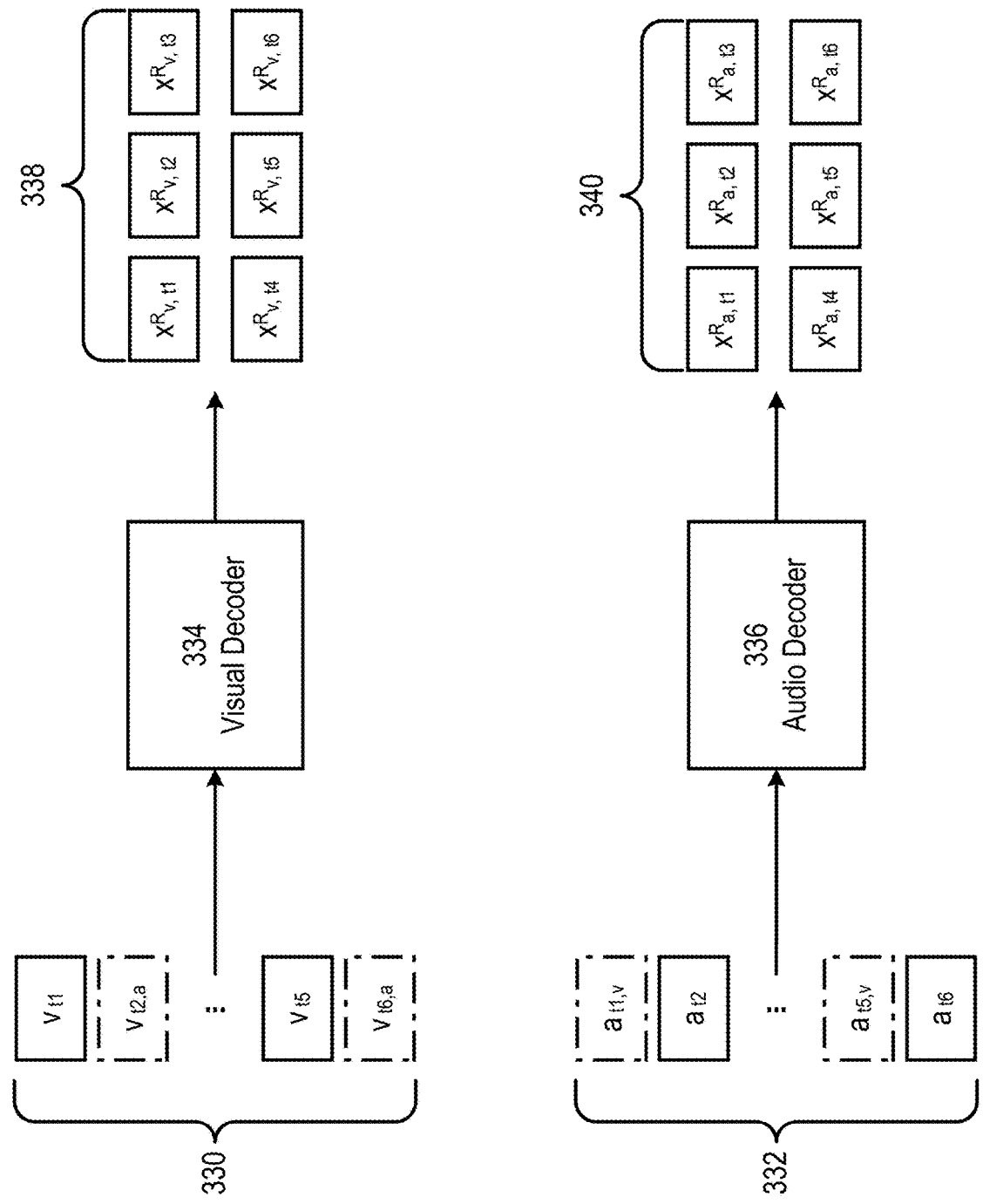
FIG. 3D shows a schematic of a process for reconstructing input video data from cross-modal representations, according to some embodiments.

A schematic of a process for decoding process (e.g., a process corresponding to steps 218-220 of method 200) is illustrated in FIG. 3D. The updated sequence of image embeddings 330 may be input into a visual decoder 334 and the updated sequence of audio embeddings 332 may be input into an audio decoder 336. Using the updated sequence of image embeddings 330, visual decoder 334 may produce a reconstruction 338 of the plurality of image tiles from the input video. Using the updated sequence of audio embeddings 332, audio decoder 336 may produce a reconstruction 340 of the plurality of audio data segments from the input video.

Executing method 200 for a plurality of input videos may train the audio and visual encoders, the A2V and V2A networks, and the audio and visual decoders. For the learning, a dual-objective loss function may be employed. This loss function may compute an audio-visual contrastive loss $\mathcal{L}_C$ between the audio and visual feature embeddings and an autoencoder loss $\mathcal{L}_{ae}$ between the input audio/visual data and the reconstructed audio/visual data.

The audio-visual contrastive loss $\mathcal{L}_C$ may be configured to enforce similarity constraints between the audio and visual embeddings of a given input video. In some embodiments, the audio-visual contrastive loss $\mathcal{L}_C$ is defined as follows:

$$\mathcal{L}_C = -\sum_{p,q \in \{a,v\}, p \neq q} \frac{1}{2N} \sum_{i=1}^{N} \log\left[\frac{\exp(\|\bar{p}^{(i)}\|^T \|\bar{q}^{(i)}\|/\tau)}{\sum_{j=1}^{N} \exp(\|\bar{p}^{(i)}\|^T \|\bar{q}^{(j)}\|/\tau)}\right] \qquad \text{(Equation 12)}$$

In Equation 12, $\bar{p}^{(i)} = \text{Mean}(p^{(i)})$ is the mean latent (embedding) vector across the patch dimension of the uni-modal embeddings of the i-th data sample, N is the number of video samples, $\tau$ is a temperature parameter that controls the spread of the distribution $$\frac{\exp(\|\bar{p}^{(i)}\|^T \|\bar{q}^{(i)}\|/\tau)}{\sum_{j=1}^{N} \exp(\|\bar{p}^{(i)}\|^T \|\bar{q}^{(j)}\|/\tau)}$$

and i, j are sample indices.

The autoencoder loss $\mathcal{L}_{ae}$ may be composed of a reconstruction loss $\mathcal{L}_{rec}$ and an adversarial loss $\mathcal{L}_{adv}$. The reconstruction loss $\mathcal{L}_{rec}$ may be computed between the plurality of image tiles and the plurality of audio data segments ($X_v$, $X_a$) and their respective reconstructions ($X_v^R$, $X_a^R$) and may be computed only over the masked tokens. In some embodiments, the reconstruction loss $\mathcal{L}_{rec}$ is defined by equation 13:

$$\mathcal{L}_{rec} = \sum_{p \in \{a,v\}} \frac{1}{N} \sum_{i=1}^{N} \|M_p \cdot X_p^{(i)} - M_p \cdot X_p^{R(i)}\| \qquad \text{(Equation 13)}$$

The adversarial loss $\mathcal{L}_{adv}$ may be configured to supplement the reconstruction loss by enhancing the features captured in the reconstructions of each modality. Similar to the reconstruction loss, the adversarial loss may be computed only on the masked tokens. In some embodiments, the Wasserstein GAN loss is used for the adversarial loss.

Training with an adversarial loss can comprise a generator training step and a discriminator training step. During the generator training step, the computed loss is back propagated through the entire model pipeline, including the encoder, A2V network, V2A network, and decoder. During the discriminator training step, the loss is back propagated through a separate discriminator network comprising a multilayer perceptron (MLP). In some embodiments, the adversarial loss during the generator and the discriminator training steps ($\mathcal{L}_{adv}^{(G)}$ and $\mathcal{L}_{adv}^{(D)}$, respectively) are given by equations 14-15:

$$\mathcal{L}_{adv}^{(G)} = -\sum_{p \in \{a,v\}} \frac{1}{N} \sum_{i=1}^{N} D_p(M_p \cdot X_p^{R(i)}) \quad \text{(Equation 14)}$$

$$\mathcal{L}_{adv}^{(D)} = -\sum_{p \in \{a,v\}} \frac{1}{N} \sum_{i=1}^{N} (D_p(M_p \cdot X_p^{R(i)}) - D_p(M_p \cdot X_p^{(i)})) \quad \text{(Equation 15)}$$

In Equations 14-15, $D_p$ denotes the discriminator of each modality.

The overall training loss $\mathcal{L}^{(G)}$ for the generative training step and the overall training loss $\mathcal{L}^{(D)}$ for the discriminative training step may be given by:

$$\mathcal{L}^{(G)} = \lambda_c \mathcal{L}_C + \lambda_{rec} \mathcal{L}_{rec} + \lambda_{adv} \mathcal{L}_{adv}^{(G)} \quad \text{(Equation 16)}$$

$$\mathcal{L}^{(D)} = \mathcal{L}_{adv}^{(D)} \quad \text{(Equation 17)}$$

where $\lambda_c$, $\lambda_{rec}$, and $\lambda_{adv}$ represent loss weights for the contrastive loss, the reconstruction loss, and the adversarial loss, respectively. Computing the autoencoding loss on the masked temporal slices may strictly enforce the decoders of each modality to learn from the other modality, as the input embeddings for the decoder at masked indices are obtained from the other modality. This strategy may explicitly enforce audio-visual correspondence supplementing the contrastive loss objective.

As noted above, to train the audio and visual encoders, the A2V and V2A networks, and the audio and visual decoders, method 200 may be executed for a plurality of input videos. These input videos may be real videos (e.g., videos that are not AI-generated). In some embodiments, the input videos may show human faces. Working exclusively with real face videos during training may cause the model to learn the dependency between "real" speech audio and the corresponding visual facial features.

Figure 4:
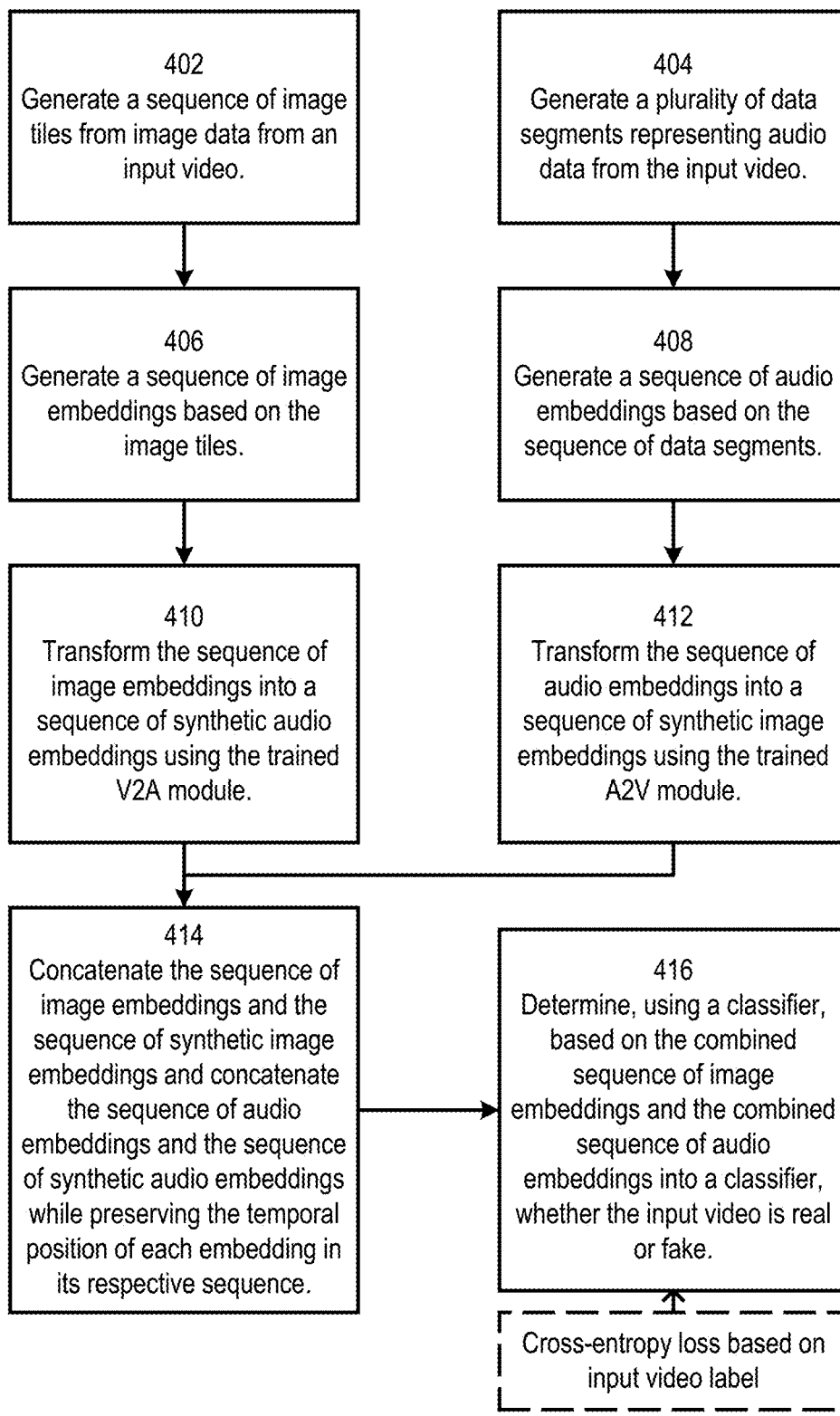
FIG. 4 shows a method for training a classifier to detect fake videos, according to some embodiments.

After the audio encoder, the visual encoder, the A2V network, and the V2A network have been trained (e.g., by executing method 200 for a plurality of real input videos), the trained encoders and cross-modal networks may be used to train a classifier to detect fake videos. FIG. 4 provides an exemplary method 400 for training a classifier to detect fake videos. Method 400 may be executed using a computer system and may produce a trained classifier such as classifier 106 shown in FIG. 1. The computer system used to perform method 400 may, for example, comprise one or more electronic devices implementing a software platform. In other examples, the computer system may be a client-server system, in which case the blocks of method 400 may be divided up between the server and a client device, between the server and multiple client devices, using only a client device, or using only multiple client devices.

In various embodiments of method 400, some blocks are, optionally, combined, the order of some blocks is, optionally, changed, and some blocks are, optionally, omitted. In some examples, additional steps may be performed in combination with the blocks of method 400. Accordingly, the operations as illustrated (and described in greater detail below) are exemplary by nature and, as such, should not be viewed as limiting.

A preprocessing stage may be performed prior to executing method 400. In the preprocessing stage, an input video may be processed to extract image data and audio data using the same techniques described above with respect to method 200. For method 400, the input video may be a sample from a labeled dataset $D_f$ comprising both real and fake videos—that is, the input video may be a sample $(x, y) \in D_f$, where x is the video and y is a label indicating whether the video is real or fake. A sequence of image tiles $X_v$ may then be generated from the image data that is extracted from the input video (step 402 of method 400) and a sequence of audio data segments $X_a$ may be generated from the audio data that is extracted from the input video (step 404 of method 400). The sequence of image tiles and the plurality of audio data segments may be generated using the techniques discussed above with respect to steps 202-204 of method 200.

After the sequence of image tiles is generated, it may be provided as input to a trained visual encoder $E_v$ to generate a sequence of image embeddings v (step 406 of method 400), e.g., as defined by Equation 2. Likewise, after the plurality of audio data segments is generated, it may be provided as input to a trained audio encoder $E_a$ to generate a sequence of audio embeddings a (step 408 of method 400), e.g., as defined by Equation 3. The trained visual encoder and the trained audio encoder may have been trained using a protocol such as method 200 (FIG. 2).

The sequence of image embeddings v may provided as input to a trained visual-to-audio (V2A) network to obtain a sequence of synthetic audio embeddings $a_v$ (step 410 of method 400). The sequence of synthetic audio embeddings $a_v$ can be defined as follows:

$$a_v = \{a_{t_i,v} = V2A(v_{t_i}) \forall t_i \text{ where } v_{t_i} \in v\} \quad \text{(Equation 18)}$$

Similarly, the sequence of audio embeddings a may provided as input to a trained audio-to-visual (A2V) network to obtain a sequence of synthetic image embeddings $v_a$ (step 412 of method 400). The sequence of synthetic image embeddings $v_a$ can be defined as follows:

$$v_a = \{v_{t_i,a} = A2V(a_{t_i}) \forall t_i \text{ where } a_{t_i} \in a\} \quad \text{(Equation 19)}$$

The trained V2A network and the trained A2V network may have been trained using a protocol such as method 200.

After the sequence of synthetic audio embeddings has been obtained, it may be concatenated with the sequence of audio embeddings that was generated by the audio encoder to produce a combined audio embedding sequence $f_a$ (step 414 of method 400), where:

$$f_a = a \oplus a_v \quad \text{(Equation 20)}$$

The sequence of synthetic image embeddings may likewise be concatenated with the sequence of image embeddings that was generated by the visual encoder to produce a combined image embedding sequence $f_v$ (step 414 of method 400), where:

$$f_v = v \oplus v_a \quad \text{(Equation 21)}$$

In Equations 20-21, $\oplus$ represents the concatenation operator along the feature dimension.

The combined audio embedding sequence and the combined image embedding sequence may then be provided as input to a classifier, which may determine whether the input video is real or fake (step 416 of method 400). In some embodiments, the classifier is a classifier network Q comprising two uni-modal patch reduction networks: an audio mode patch reduction network $\Psi_a$ and a visual mode patch reduction network $\Psi_a$. The patch reduction networks may be followed by a classifier head $\Gamma$. Each combined embedding sequence, $f_a$, $f_v$ may first be distilled in the patch dimension using the corresponding uni-modal patch reduction networks. The output embeddings may then be concatenated along the feature dimension and fed into the classifier head. The classifier head may output the logits l used to classify if a given sample is real or fake. In some embodiments, $$l = Q(f_a, f_v) = \Gamma(\Psi_a(f_a) \oplus \Psi_v(f_v))$$ (Equation 22)

A cross-entropy loss $\mathcal{L}_{CE}$ may be used as the learning objective and may be computed using the label y on the input video that indicates whether the input video is real or fake and the output logits l.

During inference, a video may be split into blocks of time T (the sample length during training) with a step size of T/N, which is the duration of a temporal slice. The output logits can be computed for each of the blocks and the classification decision (real or fake) can be made based on the mean of the output logits.

Figure 5A:
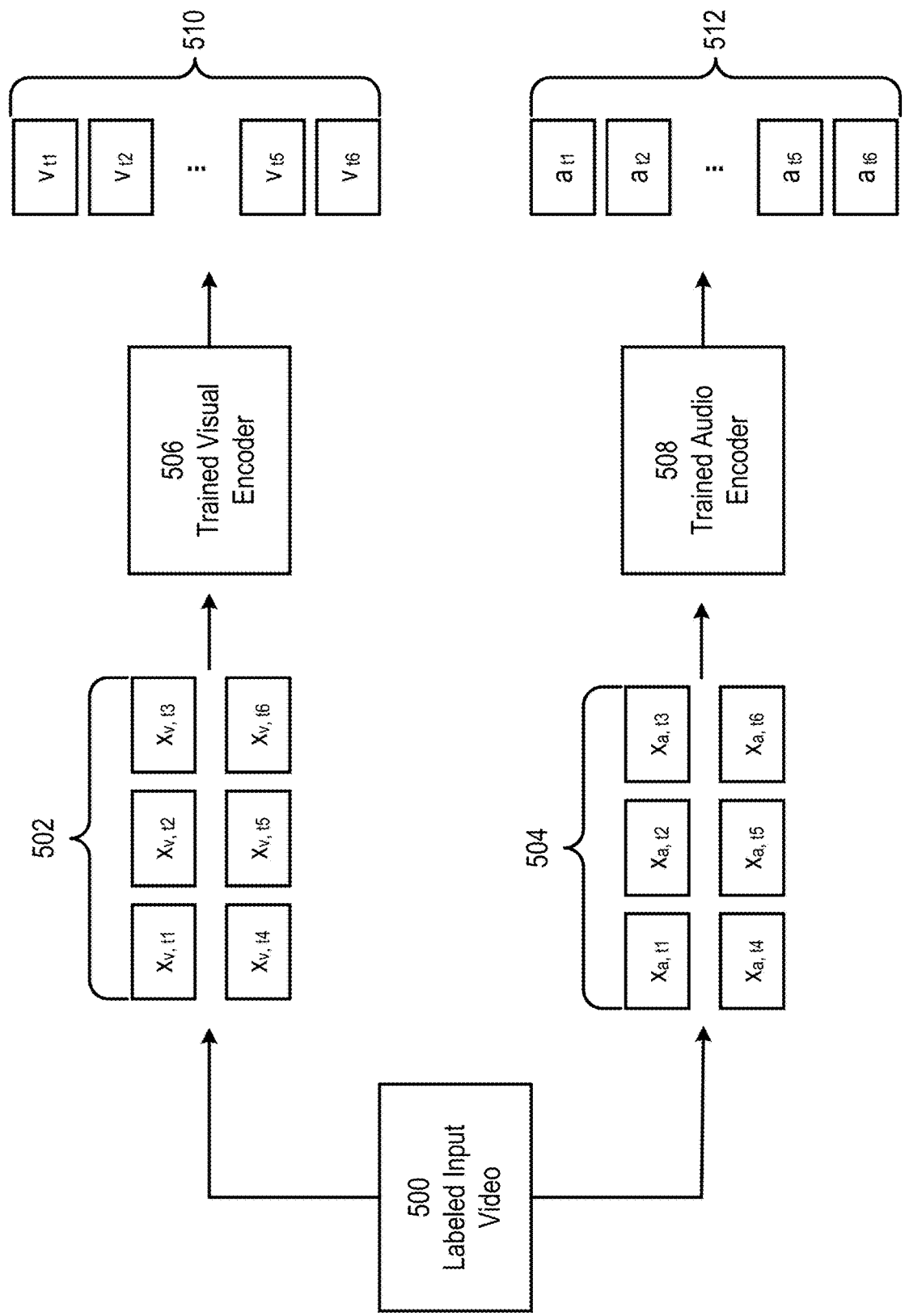
FIG. 5A shows a schematic of first portion of a process for training a classifier to detect fake videos, according to some embodiments.
Figure 5D:
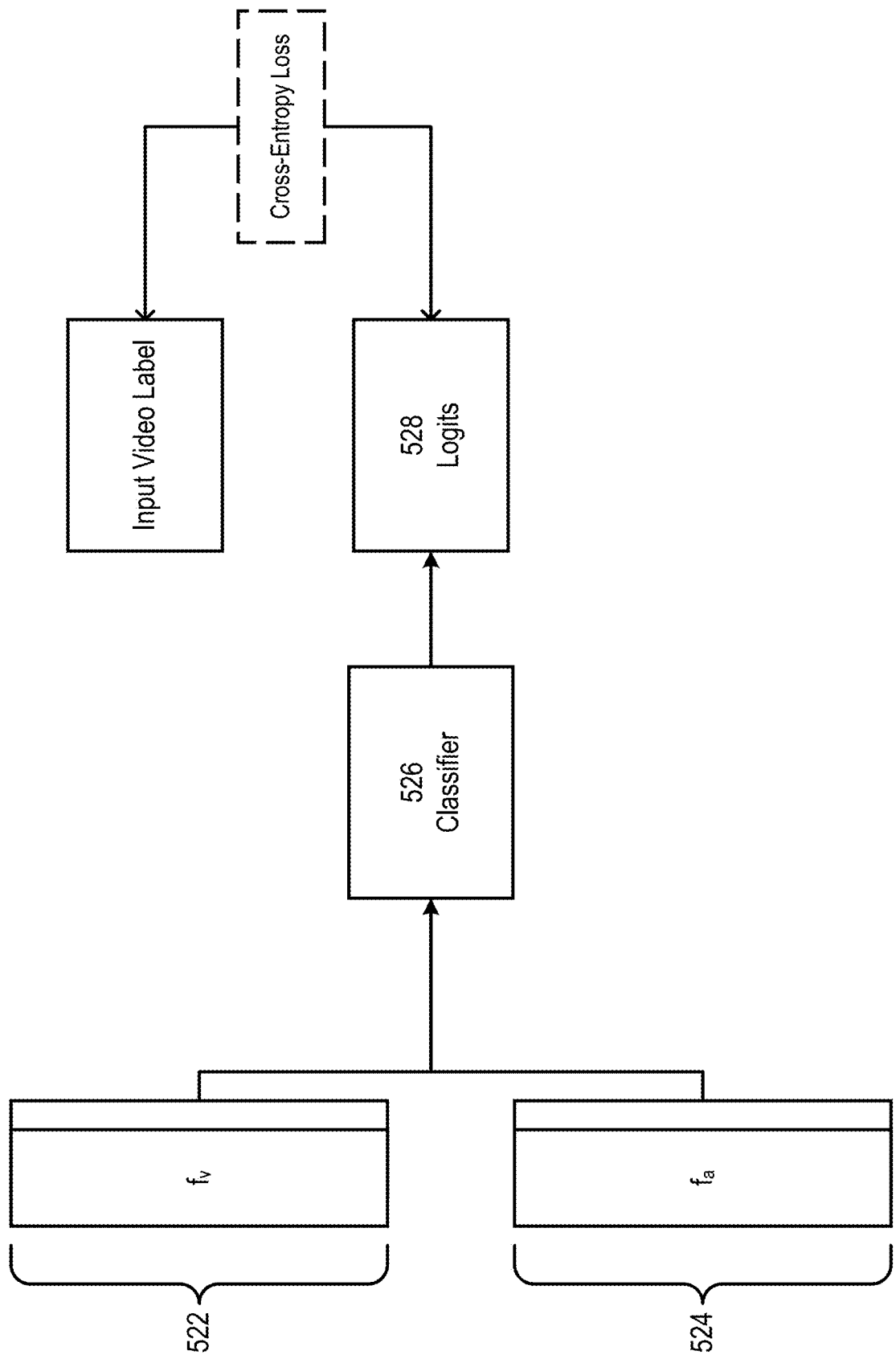
FIG. 5D shows a schematic of fourth portion of a process for training a classifier to detect fake videos, according to some embodiments.

A schematic of a process for training a classifier to detect fake videos (corresponding to method 400 shown in FIG. 4) is illustrated in FIGS. 5A-5D. A sequence of image tiles 502 and a plurality of audio data segments 504 may be generated from a labeled input video 500. Image tiles 502 may be provided to a trained visual encoder 506, which may output a sequence of image embeddings 510. Audio data segments 504 may be provided to a trained audio encoder 508, which may output a sequence of audio embeddings 512 (FIG. 5A). Image embeddings 510 may be provided as input to a trained V2A network 514 to generate a sequence of synthetic audio embeddings 518. Audio embeddings 512 may be provided as input to a trained A2V network 516 to generate a sequence of synthetic image embeddings 520 (FIG. 5B). Image embeddings 510 and synthetic image embeddings 520 may be concatenated to form a combined sequence of image embeddings 522. Audio embeddings 512 and synthetic audio embeddings 518 may be concatenated to form a combined sequence of audio embeddings 524 (FIG. 5C). The combined sequence of image embeddings 522 and the combined sequence of audio embeddings 524 may then be provided as input to a classifier 526. Classifier 526 may output logits 528 that can be used to classify whether input video 500 is real or fake. To train classifier 526, a cross-entropy loss may be computed using logits 528 and the label of input video 500.

Figure 6:
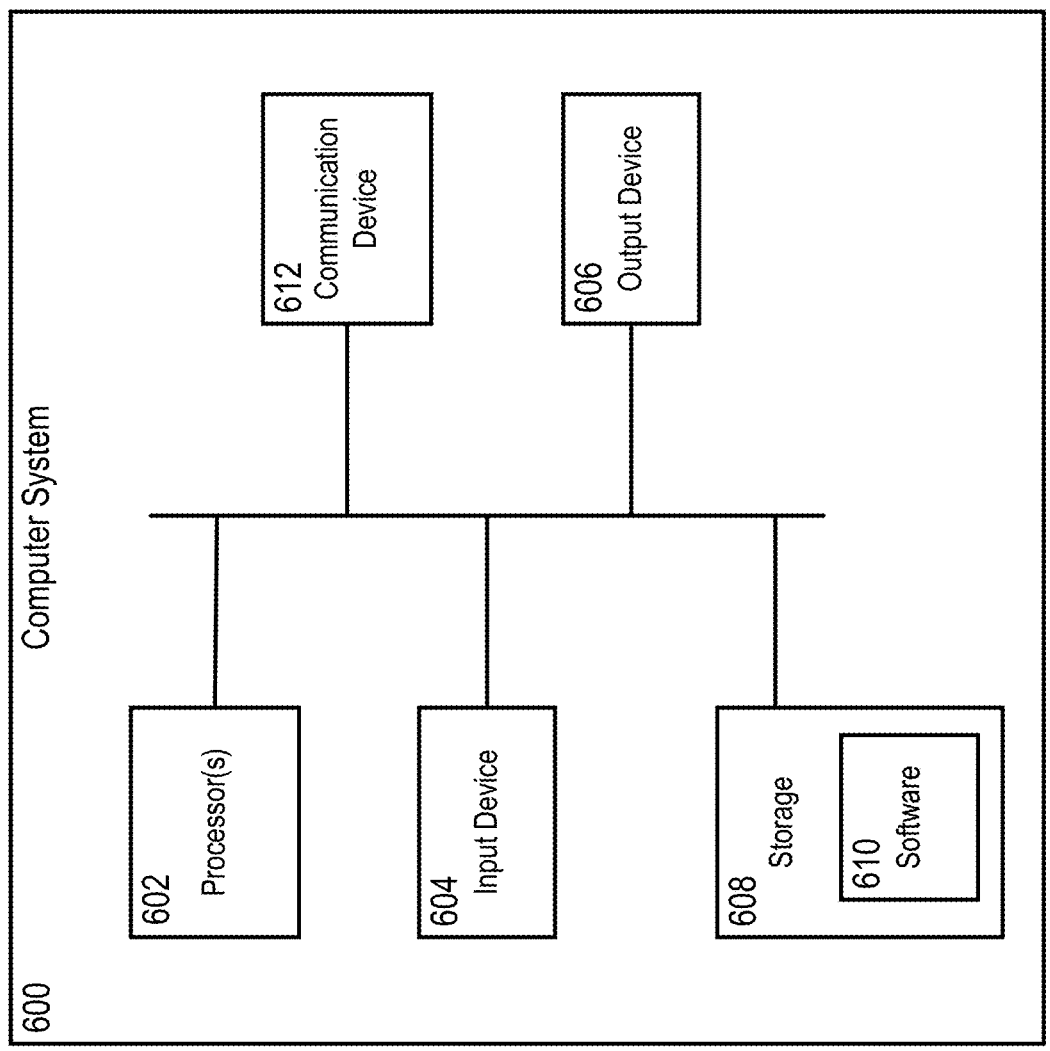
FIG. 6 shows a computer system, according to some embodiments.

FIG. 6 shows an exemplary computer system 600 that can be used to execute the described methods (e.g., method 200, method 400). Computer system 600 can be any suitable type of microprocessor-based device, such as a personal computer, workstation, server, or handheld computing device (portable electronic device) such as a phone or tablet, or dedicated device. As shown in FIG. 6, computer system 600 may include one or more classical (binary) processors 602, an input device 604, an output device 606, storage 608, and a communication device 612.

Input device 604 and output device 606 can be connectable or integrated with system 102. Input device 604 may be any suitable device that provides input, such as a touch screen, keyboard or keypad, mouse, or voice-recognition device. Likewise, output device 606 can be any suitable device that provides output, such as a display, touch screen, haptics device, or speaker.

Storage 608 can be any suitable device that provides storage, such as an electrical, magnetic, or optical memory, including a RAM, cache, hard drive, removable storage disk, or other non-transitory computer readable medium. Communication device 612 can include any suitable device capable of transmitting and receiving signals over a network, such as a network interface chip or device. The components of computer system 600 can be connected in any suitable manner, such as via a physical bus or via a wireless network.

Processor(s) 602 may be or comprise any suitable classical processor or combination of classical processors, including any of, or any combination of, a central processing unit (CPU), a field programmable gate array (FPGA), and an application-specific integrated circuit (ASIC). Software 610, which can be stored in storage 608 and executed by processor(s) 602, can include, for example, the programming that embodies the functionality of the present disclosure. Software 610 may be stored and/or transported within any non-transitory computer-readable storage medium for use by or in connection with an instruction execution system, apparatus, or device that can fetch instructions associated with the software from the instruction execution system, apparatus, or device and execute the instructions. In the context of this disclosure, a computer-readable storage medium can be any medium, such as storage 608, that can contain or store programming for use by or in connection with an instruction execution system, apparatus, or device.

Software 610 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computer system 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer system 600 can implement any operating system suitable for operating on the network. Software 610 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

EXAMPLES

Example 1

Visual and audio encoders and audio-to-visual (A2V) and visual-to-audio (V2A) networks are trained using the LRS3 dataset (Triantafyllos Afouras, Joon Son Chung, and Andrew Zisserman. Lrs3-ted: a large-scale dataset for visual speech recognition. arXiv preprint arXiv:1809.00496, 2018), which exclusively contains real videos. The trained encoders and A2V and V2A networks are then used to train classifier following a supervised learning approach using the FakeAVCeleb dataset (Hasam Khalid, Shahroz Tariq, Minha Kim, and Simon S Woo. Fakeavceleb: A novel audio-video multimodal deepfake dataset. arXiv preprint arXiv: 2108.05080, 2021). FakeAVCeleb comprises both real and fake videos, where either one or both audio-visual modalities have been synthesized using different combinations of several generative deepfake algorithms (visual: FaceSwap (Iryna Korshunova, Wenzhe Shi, Joni Dambre, and Lucas Theis. *Fast face-swap using convolutional neural networks*. In Proceedings of the IEEE international conference on computer vision, pages 3677-3685, 2017), FSGAN (Yuval Nirkin, Yosi Keller, and Tal Hassner. Fsgan: Subject agnostic face swapping and reenactment. In *Proceedings of the IEEE/CVF international conference on computer vision*, pages 7184-7193, 2019), and Wav2Lip (K R Prajwal, Rudrabha Mukhopadhyay, Vinay P Namboodiri, and CV Jawahar. A lip sync expert is all you need for speech to lip generation in the wild. In *Proceedings of the 28th ACM international conference on multimedia*, pages 484-492, 2020); audio: SV2TTS (Ye Jia, Yu Zhang, Ron Weiss, Quan Wang, Jonathan Shen, Fei Ren, Patrick Nguyen, Ruoming Pang, Ignacio Lopez Moreno, Yonghui Wu, et al. Transfer learning from speaker verification to multispeaker text-to-speech synthesis. *Advances in neural information processing systems*, 31, 2018)).

Dataset Details

LRS3: This dataset introduced by Afouras et al. exclusively comprises of real videos. It consists of 5594 videos spanning over 400 hours of TED and TED-X talks in English. The videos in the dataset are processed such that each frame contains faces and the audio and visual streams are in sync.

FakeAVCeleb: The FakeAVCeleb dataset is a deepfake detection dataset, which consists of 20,000 video clips in total. It comprises of 500 real videos sampled from the VoxCeleb2 and 19500 deepfake samples generated using different manipulation methods applied on the set of real videos. The dataset consists of the following manipulations, where the deepfake algorithms used in each category are indicated within brackets:

RVFA: Real Visuals-Fake Audio (SV2TTS)
  FVRA-FS: Fake Visuals-Real Audio (FaceSwap)
  FVFA-FS: Fake Visuals-Fake Audio (SV2TTS+FaceSwap)
  FVFA-GAN: Fake Visuals-Fake Audio (SV2TTS+FaceSwapGAN)
  FVRA-GAN: Fake Visuals-Real Audio (FaceSwapGAN)
  FVRA-WL: Fake Visuals-Real Audio (Wav2Lip)
  FVFA-WL: Fake Visuals-Fake Audio (SV2TTS+Wav2Lip)

KoDF: This dataset is a large-scale dataset comprising real and synthetic videos of 400+ subjects speaking Korean. KoDF consists of 62K+ real videos and 175K+ fake videos synthesized using the following six algorithms: FaceSwap, DeepFaceLab, FaceSwapGAN, FOMM, ATFHP, and Wav2Lip. A subset of this dataset is used to evaluate the cross-dataset generalization performance of the model.

DFDC: The DeepFake Detection Challenge (DFDC) dataset is another deepfake dataset that consists of samples with fake audio besides FakeAVCeleb. It consists of over 100K video clips in total generated using deepfake algorithms such as MM/NN Face Swap, NTH, FaceSwapGAN, StyleGAN, and TTS Skins. A subset of this dataset consisting of 3215 videos is used to evaluate the model's cross-dataset generalization performance.

DF-TIMIT: The Deepfake TIMIT dataset comprises deepfake videos manipulated using FaceSwapGAN. The real videos used for manipulation have been sourced by sampling similar looking identities from the VidTIMIT dataset. The higher-quality (HQ) version, which consists of 320 videos, was used in evaluating cross-dataset generalization performance.

Representation Learning Stage

Samples are drawn from the LRS3 dataset, which exclusively contains real videos. The audio stream is converted to a Mel-spectrogram of 128 Mel-frequency bins, with a 16 ms Hamming window every 4 ms. Video clips of T=3.2 s in duration are randomly sampled, sampling 16 visual frames and 768 audio frames (Mel) with clipping/padding where necessary. The 16 visual frames are uniformly sampled such that they are at the first and third quartile of a temporal slice (2 frames/slice×8 slices). The visual frames are resized to 224×224 spatially and are augmented using random grayscaling and horizontal flipping, each with a probability of 0.5. We make sure that in a given batch, for each sample we draw another sample from the same video but at a different time interval to make sure the model is exposed to the notion of temporal shifts when computing the contrastive loss. Both audio and visual modalities are normalized.

The encoder and decoder architectures of each modality are adopted from the VideoMAE (Zhan Tong, Yibing Song, Jue Wang, and Limin Wang. Video-mae: Masked autoencoders are data-efficient learners for self-supervised video pre-training. Advances in neural information processing systems, 35:10078-10093, 2022) based on ViT-B (Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. In International Conference on Learning Representations, 2020). Each of the A2V/V2A networks is composed of a linear layer to match the number of tokens of the other modality followed by a single transformer block.

The audio encoder and decoder are initialized using the checkpoint of AudioMAE (Po-Yao Huang, Hu Xu, Juncheng Li, Alexei Baevski, Michael Auli, Wojciech Galuba, Florian Metze, and Christoph Feichtenhofer. Masked autoencoders that listen. Advances in Neural Information Processing Systems, 35:28708-28720, 2022) pretrained on AudioSet-2M (Jort F Gemmeke, Daniel P W Ellis, Dylan Freedman, Aren Jansen, Wade Lawrence, R Channing Moore, Manoj Plakal, and Marvin Ritter. Audio set: An ontology and human-labeled dataset for audio events. In 2017 IEEE international conference on acoustics, speech and signal processing (ICASSP), 219 pages 776-780. IEEE, 2017) and the visual encoder and decoder using the checkpoint of MARLIN (Zhixi Cai, Shreya Ghosh, Kalin Stefanov, Abhinav Dhall, Jianfei Cai, Hamid Rezatofighi, Reza Haffari, and Munawar Hayat. Marlin: Masked autoencoder for facial video representation learning. In Proceedings of the IEEE/CVF Conference on Computer Vision and Pattern Recognition, pages 1493-1504, 2023) pretrained on the YouTube-Face (Lior Wolf, Tal Hassner, and Itay Maoz. Face recognition in unconstrained videos with matched background similarity. In CVPR 2011, pages 529-534. IEEE, 2011) dataset. Subsequently, the representation learning framework is trained end-to-end using the AdamW optimizer (Ilya Loshchilov and Frank Hutter. Decoupled weight decay regularization. In International Conference on Learning Representations, 2018) with a learning rate of 1.5e-4 with a cosine decay. The weights of the losses are as follows: $\lambda_c=0.01$, $\lambda_{rec}=1.0$, and $\lambda_{adv}=0.1$, which were chosen empirically. Training is performed for 500 epochs with a linear warmup for 40 epochs using a batch size of 32 and a gradient accumulation interval of 2. The training was performed on 4 RTX A6000 GPUs for approximately 60 hours.

Deepfake Classification Stage

Samples are drawn from FakeAVCeleb, which consists of deepfake videos where either or both audio and visual modalities have been manipulated. The preprocessing and sampling strategy is similar to that of representation learning stage, except an additional sample is not drawn from the same video clip as a contrastive learning objective is not used at this stage. Weighted sampling is employed to mitigate the issue of class imbalance between real and fake samples.

Each of the uni-modal patch reduction networks is a 3-layer MLP, while the classifier head is a 4-layer MLP. No changes are made to the representation learning architecture.

The representation learning framework is initialized using the pretrained checkpoint obtained from the representation learning stage. Subsequently, the pipeline is trained end-to-end using the AdamW optimizer with a cosine annealing with warm restarts scheduler with a maximum learning rate of 1.0e-4 for 50 epochs with a batch size of 32. The training was performed on 4 RTX A6000 GPUs for approximately 10 hours.

Evaluation

The performance of the model is evaluated against the existing state-of-the-art algorithms on multiple criteria: intra-dataset performance, cross-manipulation performance, and cross-dataset generalization. The results are compared against both uni-modal (visual) state-of-the-art approaches and audio-visual approaches based on accuracy (ACC), average precision (AP), and area under the ROC curve (AUC). The average results across multiple runs with different random seeds are reported. Further, for audio-visual algorithms, a video is labeled as fake if either or both audio and visual modalities have been manipulated. For uni-modal algorithms, a video is considered fake only if the visual modality has been manipulated to maintain fairness.

The model training utilizes 70% of all FakeAVCeleb samples, while the remaining 30% constitutes the unseen test set. Table 1 summarizes the performance of the model (titled "AVFF" in Table 1) against baselines using a 70-30 train-test split on the FakeAVCeleb dataset. As denoted in Table 1, the AVFF approach demonstrates substantial improvements over the existing state-of-the-art, both in audio-visual (AVoiD-DF) and uni-modal (RealForensics) deepfake detection. Compared to AVoiD-DF, the AVFF model achieves an increase in accuracy of 14.9% (+9.9% in AUC) and compared to RealForensics the accuracy increases by 8.7% (+4.5% AUC). Overall, the superior performance of audio-visual methods leveraging cross-modal correspondence is evident, outperforming uni-modal approaches that rely on uni-modal artifacts (i.e., visual anomalies) introduced by deepfake algorithms. RealForensics, while competitive, discards the audio modality during detection, limiting its applicability exclusively to visual deepfakes. This hinders its practicality as contemporary deepfakes often involve manipulations in both audio and visual modalities. The enhanced results of both RealForensics and our proposed method highlight the positive impact of employing a pre-training stage for effective representation learning.

TABLE 1

Intra-dataset performance

| Method | Modality | ACC | AUC |
|---|---|---|---|
| Xception | V | 67.9 | 70.5 |
| LipForensics | V | 80.1 | 82.4 |
| FTCN [51] | V | 64.9 | 84.0 |
| CViT [45] | V | 69.7 | 71.8 |
| RealForensics [18] | V | 89.9 | 94.6 |
| Emotions Don't Lie [34] | AV | 78.1 | 79.8 |
| MDS [7] | AV | 82.8 | 86.5 |
| AVFakeNet [24] | AV | 78.4 | 83.4 |
| VFD [6] | AV | 81.5 | 86.1 |
| AVoiD-DF [48] | AV | 83.7 | 89.2 |
| AVFF | AV | 98.6 | 99.1 |

Additional information about the algorithms against which the model was compared can be found in the following references:

Xception: Andreas Rossler, Davide Cozzolino, Luisa Verdoliva, Christian Riess, Justus Thies, and Matthias Nießner. Faceforensics++: Learning to detect manipulated facial images. In *Proceedings of the IEEE/CVF international conference on computer vision*, pages 1-11, 2019.

LipForensics: Alexandros Haliassos, Konstantinos Vougioukas, Stavros Petridis, and Maja Pantic. Lips don't lie: A generalisable and robust approach to face forgery detection. In *Proceedings of the IEEE/CVF conference on computer vision and pattern recognition*, pages 5039-5049, 2021.

FTCN: Yinglin Zheng, Jianmin Bao, Dong Chen, Ming Zeng, and Fang Wen. Exploring temporal coherence for more general video face forgery detection. In *Proceedings of the IEEE/CVF international conference on computer vision*, pages 15044-15054, 2021.

CVIT: Deressa Wodajo and Solomon Atnafu. Deepfake video detection using convolutional vision transformer. *arXiv preprint arXiv:* 2102.11126, 2021.

RealForensics: Alexandros Haliassos, Rodrigo Mira, Stavros Petridis, and Maja Pantic. Leveraging real talking faces via self-supervision for robust forgery detection. In *Proceedings of the IEEE/CVF Conference on Computer Vision and Pattern Recognition*, pages 14950-14962, 2022.

Emotions Don't Lie: Trisha Mittal, Uttaran Bhattacharya, Rohan Chandra, Aniket Bera, and Dinesh Manocha. Emotions don't lie: An audio-visual deepfake detection method using affective cues. *In Proceedings of the 28th ACM international conference on multimedia*, pages 2823-2832, 2020.

MDS: Komal Chugh, Parul Gupta, Abhinav Dhall, and Ramanathan Subramanian. Not made for each other-audiovisual dissonance-based deepfake detection and localization. In *Proceedings of the 28th ACM international conference on multimedia*, pages 439-447, 2020.

AVFakeNet: Hafsa Ilyas, Ali Javed, and Khalid Mahmood Malik. Avfakenet: A unified end-to-end dense swin transformer deep learning model for audio-visual deepfakes detection. *Applied Soft Computing*, 136:110124, 2023.

VFD: Harry Cheng, Yangyang Guo, Tianyi Wang, Qi Li, Xiaojun Chang, and Liqiang Nie. Voice-face homogeneity tells deepfake. *arXiv preprint arXiv*: 2203.02195, 2022.

AVoiD-DF: Wenyuan Yang, Xiaoyu Zhou, Zhikai Chen, Bofei Guo, Zhongjie Ba, Zhihua Xia, Xiaochun Cao, and Kui Ren. Avoid-df: Audio-visual joint learning for detecting deepfake. *IEEE Transactions on Information Forensics and Security*, 18:2015-2029, 2023.

The model's performance is assessed on samples generated using previously unseen manipulation methods. The scalability of deepfake detection algorithms to unseen manipulation methods is crucial for adapting to evolving threats, thus ensuring wide applicability across diverse scenarios. The FakeAVCeleb is partitioned dataset into five categories—(i) RVFA: Real Visual-Fake Audio (SV2TTS), (ii) FVRA-WL: Fake Visual-Real Audio (Wav2Lip), (iii) FVFA-FS: Fake Visual-Fake Audio (FaceSwap+Wav2Lip+SV2TTS), (iv) FVFA-GAN: Fake Visual-Fake Audio (FaceSwapGAN+Wav2Lip+SV2TTS), and (v) FVFA-WL: Fake Visual-Fake Audio (Wav2Lip+SV2TTS)-based on the algorithms used to generate the deepfakes. The model is evaluated using these categories, leaving one category out for testing while training on the remaining categories. Results are reported in Table 2. The AVFF achieves the best performance in almost all cases (and at par with the rest) and, notably, yields consistently enhanced performance (AUC>484 92+%, AP>93+%) across all categories, while other baselines (Xception, LipForensics, FTCN, AVDFD) fall short in categories FVFA-GAN and RVFA.

TABLE 3B

Cross-dataset generalization on DF-TIMIT and DFDC datasets
(AP: Average Precision; AUC: Area under ROC curve)

| Method | Modality | DF-TIMIT AP | DF-TIMIT AUC | DFDC AP | DFDC AUC |
|---|---|---|---|---|---|
| Xception | V | 86.0 | 90.5 | 68.0 | 67.9 |
| LipForensics | V | 96.7 | 98.4 | 76.8 | 77.4 |
| FTCN | V | 100 | 99.8 | 70.5 | 71.1 |
| RealForensics | V | 99.2 | 99.5 | 82.9 | 83.7 |
| AVFF | AV | 100 | 100 | 97.0 | 86.2 |

Figure 7:
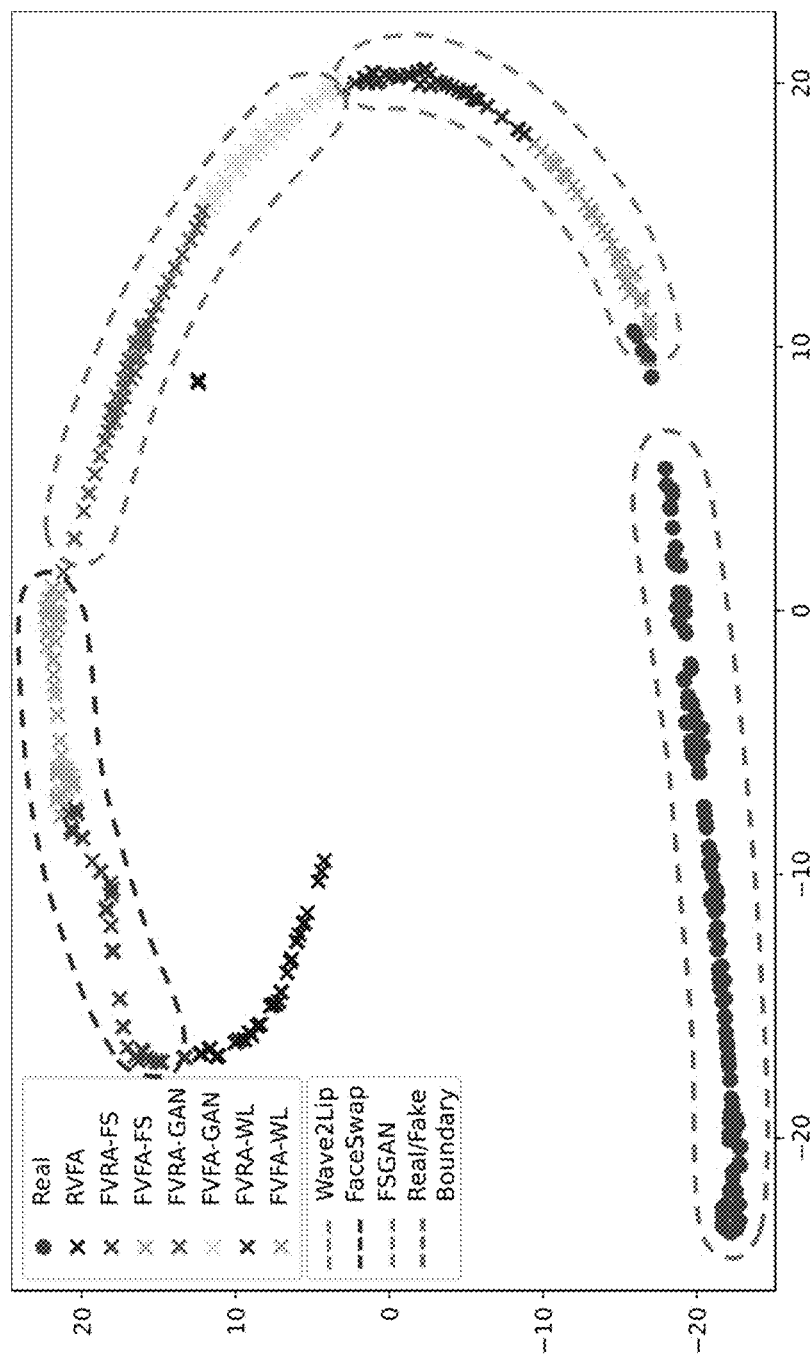
FIG. 7 shows t-Stochastic Neighbor Embedding plots for an example dataset comprising real and fake videos.

FIG. 7 shows t-distributed Stochastic Neighbor Embedding (t-SNE) plots of embeddings for random samples for each category (real videos, videos with real audio and fake visuals, videos with fake audio and real visuals, etc.) of the FakeAVCeleb dataset. As shown, distinct clusters are evident for each deepfake category, indicating that representations generated by the AVFF model are capable of capturing subtle cues that differentiate different deepfake algorithms despite not encountering any of them during the representation learning training stage. A further analysis of the t-SNE visualizations reveals that the samples belonging to adjacent clusters are related in terms of the deepfake algorithms used to generate them. For instance, FVRA-WL and FVFA-WL, which are adjacent, both employ Wav2Lip to synthesize the deepfakes (refer to the encircled regions in FIG. 7). These findings underscore the efficacy of the audio-visual representation learning paradigm.

TABLE 2

FakeAVCeleb Cross-Manipulation Generalization

| Method | Modality | RVFA AP | RVFA AUC | FVFA-WL AP | FVFA-WL AUC | FVFA-FS AP | FVFA-FS AUC | FVFA-GAN AP | FVFA-GAN AUC | FVFA-WL AP | FVFA-WL AUC | AVG-FV AP | AVG-FV AUC |
|---|---|---|---|---|---|---|---|---|---|---|---|---|---|
| Xception | V | — | — | 88.2 | 88.3 | 92.3 | 93.5 | 67.6 | 68.5 | 91.0 | 91.0 | 84.8 | 85.3 |
| LipForensics | V | — | — | 97.8 | | 99/100 | 99/100 | 61.5 | 68.1 | 98.6 | 98.7 | 89.4 | 91.1 |
| FTCN | V | — | — | 96.2 | 97.4 | | | 77.4 | 78.3 | 95.6 | 96.5 | 92.3 | 93.1 |
| RealForensics | V | — | — | 88.8 | 93.0 | 99.3 | 99.1 | 99.8 | 99.8 | 93.4 | 96.7 | 95.3 | 97.1 |
| AV-DFD | AV | 74.9 | 73.3 | 97.0 | 97.4 | 99.6 | 99.7 | 58.4 | 55.4 | 100. | 100. | 88.8 | 88.1 |
| AVAD (LRS2) | AV | 62.4 | 71.6 | 93.6 | 93.7 | 95.3 | 95.8 | 94.1 | 94.3 | 93.8 | 94.1 | 94.2 | 94.5 |
| AVAD (LRS3) | AV | 70.7 | 80.5 | 91.1 | 93.0 | 91.0 | 92.3 | 91.6 | 92.7 | 91.4 | 93.1 | 91.3 | 92.8 |
| AVFF | AV | 93.3 | 92.4 | 94.8 | 98.2 | 100. | 100. | 99.9 | 100. | 99.4 | 99.8 | 98.5 | 99.5 |

The adaptability of the model to a different data distribution is evaluated by testing on a subset of the KoDF dataset, as well as on the DF-TIMIT dataset and a subset of the DFDC dataset (Tables 3A-3B).

TABLE 3A

Cross-dataset generalization on KoDF dataset
(AP: Average Precision; AUC: Area under ROC curve)

| Method | Modality | AP | AUC |
|---|---|---|---|
| Xception | V | 76.9 | 77.7 |
| LipForensics | V | 89.5 | 86.6 |
| FTCN | V | 66.8 | 68.1 |
| RealForensics | V | 95.7 | 93.6 |
| AV-DFD | AV | 79.6 | 82.1 |
| AVAD | AV | 87.6 | 86.9 |
| AVFF | AV | 93.1 | 95.5 |

Example 2

Impact of the Autoencoding Objective

In this experiment, the model is using only the contrastive loss objective, discarding the autoencoding objective, which effectively scraps away the complementary masking, cross-modality fusion, and decoding modules. The feature embeddings at the output of the encoders a, v are used for the downstream training. Results (see row (i) in Table 4) indicate a performance reduction, highlighting the importance of the autoencoding objective.

Impact of the Cross-Modal Fusion

In this ablation, the A2V/V2A networks, which predict the masked tokens of the other modality, are discarded, and shared learnable masked tokens similar to MAE approaches are used. The performance of the model diminishes (especially AP) (see row (ii) in Table 4). This signifies the importance of the cross-modal fusion module, as it supplements the representation of a given modality with information extracted from the other modality, which helps build the correspondence between the two modalities.

Impact of Complementary Masking

Replacing complementary masking with random masking results in a notable drop in AP and AUC scores, affecting the model's ability to learn correspondences (see row (iii) in Table 4). This performance drop can be attributed to the inability of the model to learn correspondences between audio and visual modalities due to the randomness, which indicates the importance of complementary masking in the proposed method.

Impact of Concatenation of Different Embeddings

In the deepfake classification stage, the feature embeddings (a, v) are concatenated with the cross-modal embeddings ($a_v$, $v_a$), creating the concatenated embeddings ($f_a$, $f_v$). In this experiment, the model performance is evaluated using each of the embeddings in isolation (see rows (iv) and (v) in Table 4). While the use of each embedding generates promising results, the synergy of the two embeddings enhances the performance.

Impact of Uni-Modal Patch Reduction

Replacing the uni-modal patch reduction networks ($\Psi_a$, $\Psi_v$) with Mean Pooling dents the performance slightly (see row (vi) in Table 4), which could be due to the suppression of subtle discriminative cues existing in fewer patches. Thus, the use of an MLP to reduce the patch dimension is justified, which effectively computes a weighted mean with learnable weights.

TABLE 4

Evaluations on Ablations

| Method | AP | AUC |
| --- | --- | --- |
| (i) Only contrastive loss | 84.2 | 90.3 |
| (ii) Ours w/o cross-modality fusion | 87.2 | 93.1 |
| (iii) Ours w/o complementary masking | 78.9 | 90.7 |
| (iv) Only feature embeddings | 89.7 | 97.6 |
| (v) Only cross-modal embeddings | 94.6 | 98.0 |
| (vi) Mean Pooling features | 96.5 | 98.1 |
| AVFF | 96.7 | 99.1 |

Example 3

The performance of the model was evaluated on several unseen perturbations applied to each modality. Such perturbations may occur during video post-processing, e.g., when sharing videos through social medial platforms.

Visual Perturbations

Figure 8A:
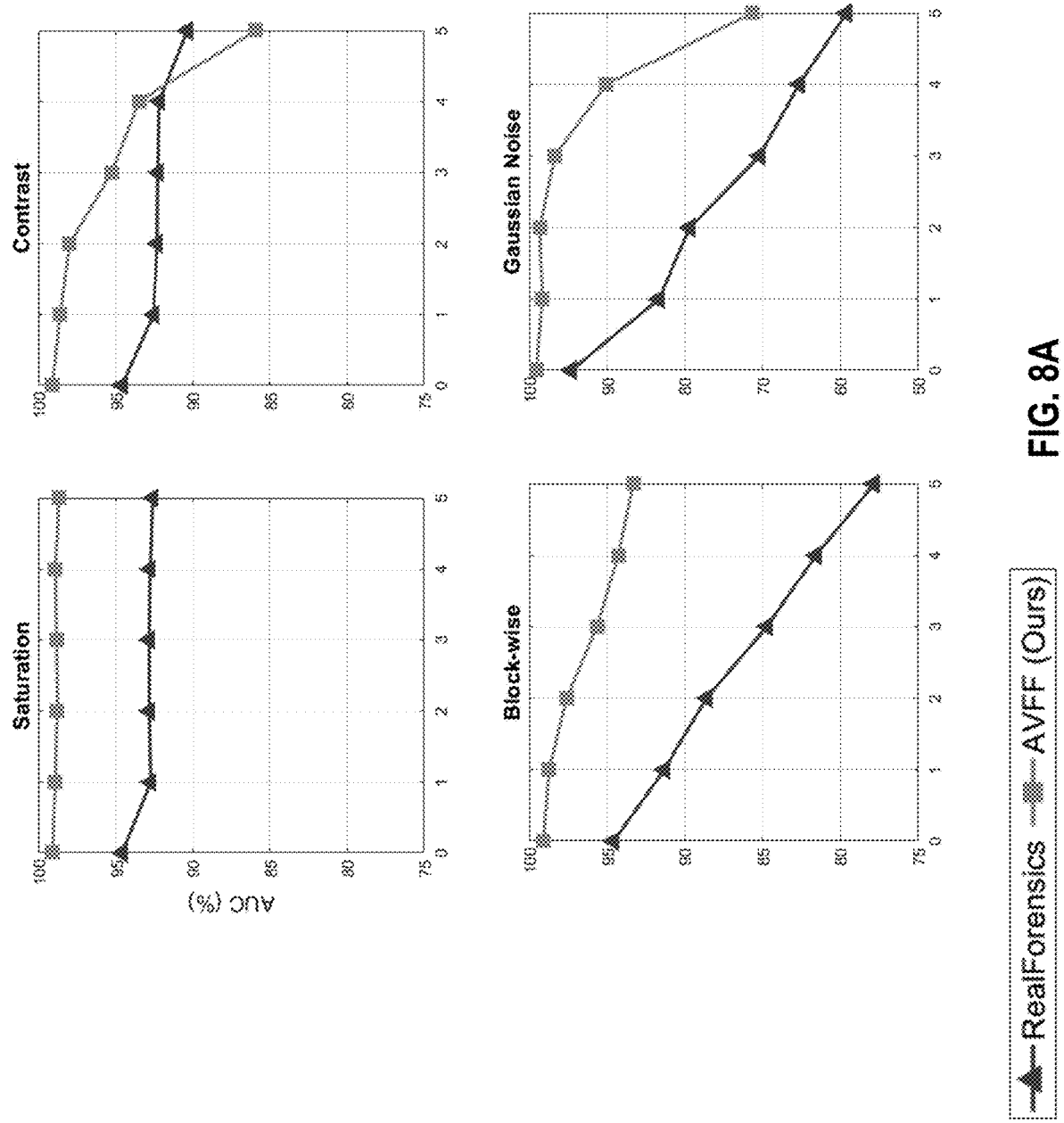
FIG. 8A shows example data illustrating the AUC scores as a function of different levels of intensities for various visual perturbations evaluated on a test data set.
Figure 8B:
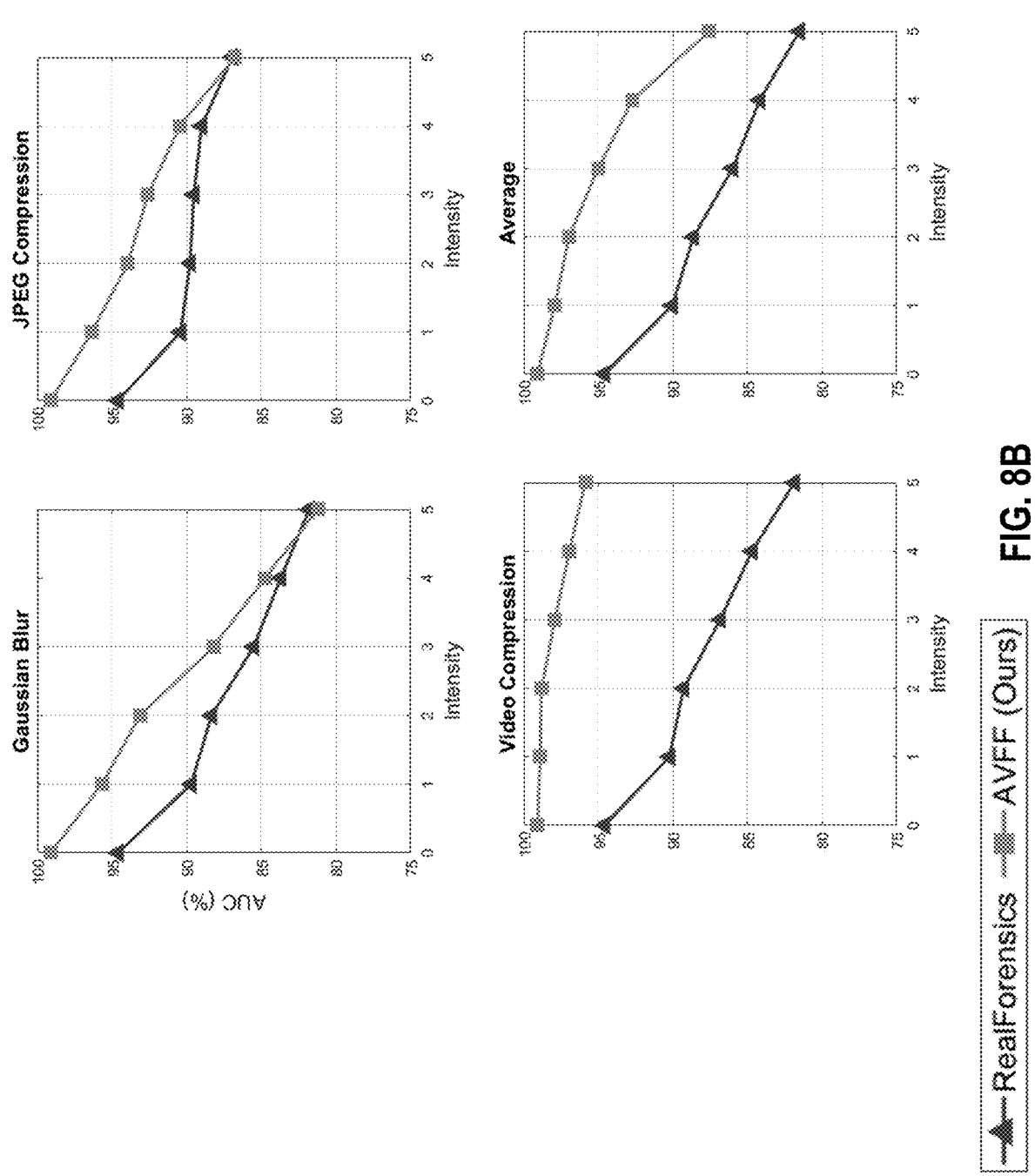
FIG. 8B shows example data illustrating the AUC scores as a function of different levels of intensities for various visual perturbations evaluated on a test data set.

The performance of the model was evaluated on the following visual perturbations: saturation, contrast, block-wise distortion, Gaussian noise, Gaussian blur, JPEG compression, and video compression on five different levels of intensities. The implementations for the perturbations and the levels of intensities were sourced from the official repository of DeeperForensics-1.0. The model's performance was compared against RealForensics. As depicted in FIGS. 8A-8B, the model demonstrated enhanced robustness against unseen visual perturbations compared to RealForensics in most scenarios. Particularly noteworthy improvements were observed in cases of block-wise distortion, Gaussian noise, and video compression.

Audio Perturbations

Figure 9:
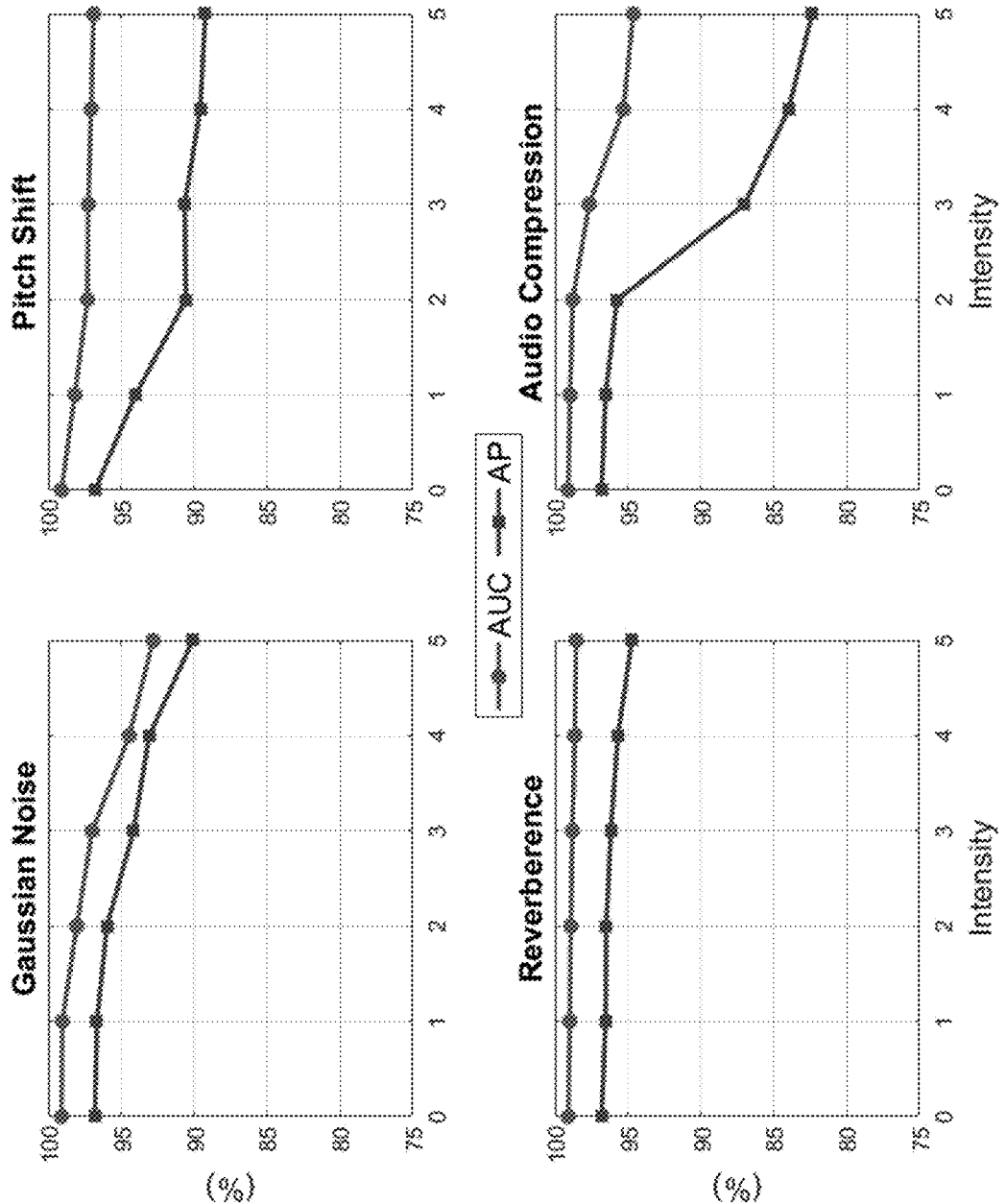
FIG. 9 shows example data illustrating the variation of AUC and AP scores as a function of different levels of intensities for various audio perturbations evaluated on a test data set.

The performance of the model was evaluated on the following audio perturbations: Gaussian Noise, pitch shift, changes in reverberance, and audio compression. FIG. 9 illustrates the model's performance under these perturbations across five intensity levels. As shown, the model is robust to various audio perturbations. Notably, the model showcases high robustness to changes in reverberance, with minimal fluctuations across all intensity levels.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

As used herein, the singular forms "a", "an", and "the" include the plural reference unless the context clearly dictates otherwise. Reference to "about" a value or parameter or "approximately" a value or parameter herein includes (and describes) variations that are directed to that value or parameter per se. For example, description referring to "about X" includes description of "X". It is understood that aspects and variations of the invention described herein include "consisting of" and/or "consisting essentially of" aspects and variations.

When a range of values or values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for training a model comprising a visual encoder, an audio encoder, an audio-to-visual (A2V) network, a visual-to-audio (V2A) network, and a classifier for classifying videos as real or fake, the method comprising:
   generating a sequence of image tiles from image data from an input video;
   generating a plurality of data segments representing audio data from the input video;
   generating a sequence of image embeddings based on the sequence of image tiles using the visual encoder;
   generating a sequence of audio embeddings based on the sequence of data segments using the audio encoder;
   transforming, using the V2A network, a first subset of the sequence of image embeddings into one or more synthetic audio embeddings, wherein the first subset of the sequence of image embeddings corresponds to a first set of time points in the input video;

transforming, using the A2V network, a first subset of the sequence of audio embeddings into one or more synthetic image embeddings, wherein the first subset of the sequence of audio embeddings corresponds to a second set of time points in the input video complementary to the first set of time points;

updating the sequence of image embeddings by replacing a second subset of the sequence of image embeddings with the one or more synthetic image embeddings, wherein the second subset of the sequence of image embeddings corresponds to the second set of time points;

updating the sequence of audio embeddings by replacing a second subset of the sequence of audio embeddings with the one or more synthetic audio embeddings, wherein the second subset of the sequence of audio embeddings corresponds to the first set of time points;

training the visual encoder, the audio encoder, the V2A network, and the A2V network based on the updated sequence of image embeddings and the updated sequence of audio embeddings;

training the classifier to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

2. The method of claim 1, wherein:
the first subset of the sequence of image embeddings comprises half of the image embeddings, and
the first subset of the sequence of audio embeddings comprises half of the audio embeddings.

3. The method of claim 1, wherein the first subset of the sequence of image embeddings and the first subset of the sequence of audio embeddings are randomly selected.

4. The method of claim 1, wherein training the visual encoder, the audio encoder, the V2A network, and the A2V network based on the updated sequence of image embeddings and the updated sequence of audio embeddings comprises:
decoding the updated sequence of image embeddings to produce a reconstruction of the sequence of image tiles; and
decoding the updated sequence of audio embeddings to produce a reconstruction of the plurality of data segments.

5. The method of claim 4, wherein the updated sequence of image embeddings is decoded using a visual decoder.

6. The method of claim 4, wherein the updated sequence of audio embeddings is decoded using an audio decoder.

7. The method of claim 1, wherein training the visual encoder, the audio encoder, the V2A network, and the A2V network based on the updated sequence of image embeddings and the updated sequence of audio embeddings further comprises computing a dual-objective loss, wherein a first objective of the dual-objective loss depends on the sequence of audio embeddings and the sequence of image embeddings and a second objective of the dual-objective loss depends on the sequence of image tiles, the plurality of data segments, the reconstruction of the sequence of image tiles, and the reconstruction of the plurality of data segments.

8. The method of claim 1, wherein training the classifier to classify videos as real or fake using the trained visual encoder, the trained audio encoder, the trained V2A network, and the trained A2V network comprises:
generating a second sequence of image tiles from image data from a labeled training video comprising a label indicating whether the labeled training video is real or fake;
generating a second plurality of data segments representing audio data from the labeled training video;
generating a second sequence of image embeddings based on the second sequence of image tiles using the trained visual encoder;
generating a second sequence of audio embeddings based on the second sequence of data segments using the trained audio encoder;
transforming, using the trained V2A network, the second sequence of image embeddings into a sequence of synthetic audio embeddings;
transforming, using the trained A2V network, the second sequence of audio embeddings into a sequence synthetic image embeddings;
concatenating the second sequence of image embeddings and the sequence of synthetic image embeddings to produce a combined sequence of image embeddings;
concatenating the second sequence of audio embeddings and the sequence of synthetic audio embeddings to produce a combined sequence of audio embeddings; and
classifying the labeled training video as real or fake based on the combined sequence of audio embeddings and the combined sequence of image embeddings.

9. The method of claim 8, wherein training the classifier to classify videos as real or fake using the trained visual encoder, the trained audio encoder, the trained V2A network, and the trained A2V network further comprises computing a cross-entropy loss objective using label indicating whether the labeled training video is real or fake.

10. The method of claim 1, wherein the classifier comprises an audio mode patch reduction network, a visual mode patch reduction network, and a classifier head.

11. The method of claim 1, wherein a number of image tiles in the sequence of image tiles and a number of data segments in the sequence of data segments are determined based on a sampling frequency of the image data, a sampling frequency of the audio data, and a time duration of the input video.

12. The method of claim 1, further comprising:
providing the trained model with a second input video; and
classifying the second input video as real or fake using the trained model.

13. The method of claim 12, wherein the second input video comprises real audio data and AI-generated image data.

14. The method of claim 12, wherein the second input video comprises real image data and AI-generated audio data.

15. The method of claim 12, wherein the second input video comprises AI-generated image data and AI-generated audio data.

16. The method of claim 1, wherein the input video shows a human face.

17. A system for training a model comprising a visual encoder, an audio encoder, an audio-to-visual (A2V) network, a visual-to-audio (V2A) network, and a classifier for classifying videos as real or fake, the system comprising one or more processors configured to:

generate a sequence of image tiles from image data from an input video;
generate a plurality of data segments representing audio data from the input video;
generate a sequence of image embeddings based on the sequence of image tiles using the visual encoder;
generate a sequence of audio embeddings based on the sequence of data segments using the audio encoder;
transform, using the V2A network, a first subset of the sequence of image embeddings into one or more synthetic audio embeddings, wherein the first subset of the sequence of image embeddings corresponds to a first set of time points in the input video;
transform, using the A2V network, a first subset of the sequence of audio embeddings into one or more synthetic image embeddings, wherein the first subset of the sequence of audio embeddings corresponds to a second set of time points in the input video complementary to the first set of time points;
update the sequence of image embeddings by replacing a second subset of the sequence of image embeddings with the one or more synthetic image embeddings, wherein the second subset of the sequence of image embeddings corresponds to the second set of time points;
update the sequence of audio embeddings by replacing a second subset of the sequence of audio embeddings with the one or more synthetic audio embeddings, wherein the second subset of the sequence of audio embeddings corresponds to the first set of time points;
train the visual encoder, the audio encoder, the V2A network, and the A2V network based on the updated sequence of image embeddings and the updated sequence of audio embeddings;
train the classifier to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

18. A non-transitory computer readable storage medium storing instructions for training a model comprising a visual encoder, an audio encoder, an audio-to-visual (A2V) network, a visual-to-audio (V2A) network, and a classifier for classifying videos as real or fake that, when executed by one or more processors of a computer system, cause the computer system to:
generate a sequence of image tiles from image data from an input video;
generate a plurality of data segments representing audio data from the input video;
generate a sequence of image embeddings based on the sequence of image tiles using the visual encoder;
generate a sequence of audio embeddings based on the sequence of data segments using the audio encoder;
transform, using the V2A network, a first subset of the sequence of image embeddings into one or more synthetic audio embeddings, wherein the first subset of the sequence of image embeddings corresponds to a first set of time points in the input video;
transform, using the A2V network, a first subset of the sequence of audio embeddings into one or more synthetic image embeddings, wherein the first subset of the sequence of audio embeddings corresponds to a second set of time points in the input video complementary to the first set of time points;
update the sequence of image embeddings by replacing a second subset of the sequence of image embeddings with the one or more synthetic image embeddings, wherein the second subset of the sequence of image embeddings corresponds to the second set of time points;
update the sequence of audio embeddings by replacing a second subset of the sequence of audio embeddings with the one or more synthetic audio embeddings, wherein the second subset of the sequence of audio embeddings corresponds to the first set of time points;
train the visual encoder, the audio encoder, the V2A network, and the A2V network based on the updated sequence of image embeddings and the updated sequence of audio embeddings;
train the classifier to classify videos as real or fake using the trained visual encoder, the trained audio encoder, the trained V2A network, and the trained A2V network, wherein the classifier is configured to receive image embeddings for the videos from the trained visual encoder, audio embeddings for the videos from the trained audio encoder, synthetic image embeddings for the videos from the trained A2V network, and synthetic audio embeddings for the videos from the trained V2A network.

* * * * *